United States Patent
Ly

(10) Patent No.: US 11,233,612 B2
(45) Date of Patent: Jan. 25, 2022

(54) DOWNLINK POSITIONING REFERENCE SIGNAL IN MULTI-BEAM SYSTEMS

(71) Applicant: QUALCOMM Incorporated, San Diego, CA (US)

(72) Inventor: Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/037,957

(22) Filed: Jul. 17, 2018

(65) Prior Publication Data

US 2019/0044677 A1 Feb. 7, 2019

Related U.S. Application Data

(60) Provisional application No. 62/539,999, filed on Aug. 1, 2017.

(51) Int. Cl.
*H04L 5/00* (2006.01)
*H04B 7/08* (2006.01)
(Continued)

(52) U.S. Cl.
CPC .......... *H04L 5/0048* (2013.01); *H04B 7/088* (2013.01); *H04W 24/08* (2013.01); *H04W 64/00* (2013.01);
(Continued)

(58) Field of Classification Search
CPC .... H04L 5/0048; H04W 64/00; H04W 24/08; H04W 88/08; H04W 88/02; H04W 72/042; H04W 76/27; H04B 7/088
See application file for complete search history.

(56) References Cited

U.S. PATENT DOCUMENTS 9,203,576 B2 12/2015 Frenne et al.
10,638,266 B2 * 4/2020 Huang .................. H04W 4/029
(Continued)

FOREIGN PATENT DOCUMENTS

CN 106165323 A 11/2016
CN 106465173 A 2/2017
(Continued)

OTHER PUBLICATIONS

Partial International Search Report—PCT/US2018/042743—ISA/EPO—Jan. 29, 2020.
(Continued)

*Primary Examiner* — Christopher P Grey
(74) *Attorney, Agent, or Firm* — Thien T. Nguyen

(57) ABSTRACT

Methods, systems, and devices for wireless communication are described. A base station and user equipment (UE) may use quasi co-located antenna ports for transmission and reception of synchronization and/or reference signals and positioning reference signals. For example, the base station may identify a quasi co-location relationship indicating that antenna ports of the base station used to transmit a synchronization signal are quasi co-located with antenna ports of the base station used to transmit a positioning reference signal. In some cases, the base station may transmit an indication of the quasi co-location relationship to the UE. Additionally, the UE may receive the synchronization signal and determine a receive beam for the UE to use to receive the positioning reference signal based at least in part on the received synchronization signal and the identified quasi co-location relationship. The UE may then receive a positioning reference signal using the determined receive beam.

30 Claims, 16 Drawing Sheets

(51) Int. Cl.
*H04W 64/00* (2009.01)
*H04W 24/08* (2009.01)
*H04W 76/27* (2018.01)
*H04W 72/04* (2009.01)
*H04W 88/02* (2009.01)
*H04W 88/08* (2009.01)

(52) U.S. Cl.
CPC .......... *H04W 72/042* (2013.01); *H04W 76/27* (2018.02); *H04W 88/02* (2013.01); *H04W 88/08* (2013.01)

(56) References Cited

U.S. PATENT DOCUMENTS

| | | | | |
|---|---|---|---|---|
| 2015/0016369 | A1* | 1/2015 | Park | H04B 7/024 370/329 |
| 2015/0382318 | A1* | 12/2015 | Kim | G01S 5/0215 455/456.5 |
| 2016/0223639 | A1* | 8/2016 | Davydov | G01S 5/04 |
| 2016/0334499 | A1 | 11/2016 | Fischer | |
| 2017/0111880 | A1* | 4/2017 | Park | H04W 4/02 |
| 2017/0288743 | A1 | 10/2017 | Nam et al. | |
| 2017/0289831 | A1* | 10/2017 | Park | G01S 5/0236 |
| 2017/0339516 | A1* | 11/2017 | Edge | H04W 48/12 |
| 2018/0049245 | A1 | 2/2018 | Islam et al. | |
| 2018/0139763 | A1* | 5/2018 | Bitra | H04L 27/2666 |
| 2018/0270784 | A1* | 9/2018 | Lee | H04J 11/00 |
| 2018/0294934 | A1* | 10/2018 | Kim | H04L 5/005 |
| 2018/0331860 | A1* | 11/2018 | Bergman | H04L 5/0023 |
| 2019/0296868 | A1* | 9/2019 | Zhang | H04B 17/364 |
| 2019/0335442 | A1* | 10/2019 | Wu | H04B 7/06 |
| 2019/0349938 | A1* | 11/2019 | Chen | G01S 5/0205 |
| 2019/0356379 | A1* | 11/2019 | Takeda | H04B 7/08 |

FOREIGN PATENT DOCUMENTS

| | | |
|---|---|---|
| EP | 3343811 A1 | 7/2018 |
| WO | WO-2015133825 A1 | 9/2015 |
| WO | WO-2017034182 A1 | 3/2017 |
| WO | WO2018030849 A1 | 2/2018 |
| WO | WO2018059458 A1 | 4/2018 |

OTHER PUBLICATIONS

Qualcomm Incorporated: "Discussion on QCL", 3GPP Draft, R1-1711176, 3rd Generation Partnership Project (3GPP), Mobile Competence Centre, 650, Route Des, Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300376, 4 Pages, Retrieved from the Internet, URL: http://www.3gpp.org/ftp/Meetings_3GPP_SYNC/RAN1/Docs/. [Retrieved on Jun. 26, 2017] paragraph [02 .1] table 1.

SAMSUNG: "Remaining Minimum System Information Delivery", 3GPP Draft, R1-1710630-RMSI Delivery, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299837, Retrieved from the Internet, URL: http://www.3gpp.org/ftp/Meetings_3GPP_SYNC/RAN1/Docs/. [retrieved on Jun. 26, 2017], paragraph [0003].

International Search Report and Written Opinion—PCT/US2018/042743—ISA/EPO—dated Jan. 29, 2020.

* cited by examiner

DOWNLINK POSITIONING REFERENCE SIGNAL IN MULTI-BEAM SYSTEMS

CROSS REFERENCES

The present Application for Patent claims the benefit of U.S. Provisional Patent Application No. 62/539,999 by Ly, entitled "DOWNLINK POSITIONING REFERENCE SIGNAL IN MULTI-BEAM SYSTEMS," filed Aug. 1, 2017, assigned to the assignee hereof, and expressly incorporated by reference herein in its entirety.

BACKGROUND

The following relates generally to wireless communication, and more specifically to downlink positioning reference signal in multi-beam systems. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless systems, devices (e.g., base stations and UEs) may communicate using directional transmissions (e.g., beams), in which beamforming may be applied using multiple antenna elements to provide a beam in a particular direction. In some cases, wireless systems may support both single and multi-beam system operations. Single beam operations may be enabled for low frequency bands (e.g., below 3 GHz) while multi-beam operations may be enabled for high frequency bands (e.g., 3-6 GHz or mmW).

In some cases, positioning support may be desired or required for services, such as emergency services (e.g., E911). Downlink-based positioning, also known as UE-based positioning, may include a base station sending a positioning reference signal (PRS) in the downlink to support the positioning procedures. The PRS may be a new radio PRS (NR-PRS). Uplink-based positioning, also known as network-based positioning, may include a UE sending a PRS or existing reference signal such as a sounding reference signal (SRS) in the uplink signal to support positioning procedures.

However, in some examples of a wireless communications system, for example systems using directional transmissions, UE positioning procedures and techniques compatible with directional transmissions may not be supported. As a result, the UE may resort to using alternative or legacy systems capable of supporting UE positioning to provide services that require UE positioning support. Techniques used in these systems may perform poorly in systems using directional transmissions, and it may be desirable to develop new techniques to use in systems using directional systems so that positioning support is available as new wireless communications systems are introduced. For example, when a base station does not know the direction in which to transmit a PRS to a UE, the base station may transmit to the UE by sweeping through a set of transmit beams focused in different directions, transmitting data and/or reference signals (e.g., a PRS) on each of the transmit beams. Additionally or alternatively, the UE may sweep through a set of receive beams in an attempt to locate and identify an ideal receive beam on which the UE may receive the signals the base station is transmitting. Sweeping through different sets of beams may be costly in terms of time, power consumption, and resources, and measurement latency at the UE may be high.

SUMMARY

The described techniques relate to improved methods, systems, devices, or apparatuses that support downlink positioning reference signal in multi-beam systems and quasi co-location of antenna ports used to transmit paging message and synchronization signals. Generally, the described techniques provide for making the antenna ports used to transmit reference signals (e.g., synchronization signals, channel state information reference signals (CSI-RS) for tracking or beam management, physical broadcast channel (PBCH) signals, demodulation reference signals (DRMS)), quasi co-located (QCL) with the antenna ports used to transmit positioning reference signals (PRS). A user equipment (UE) may receive an indication of the QCL antenna configuration. A base station may perform a beam sweeping procedure and transmit a reference signal. The UE may receive the reference signal, and may utilize the synchronization signal to determine a preferred receive beam. The UE may utilize the preferred beam to receive the PRS without performing additional receive beam sweeping, resulting in reduced processing overhead and measurement latency.

A method of wireless communication at a UE is described. The method may include identifying a quasi co-location relationship indicating that one or more antenna ports of a base station used to transmit a reference signal are quasi co-located with one or more antenna ports of the base station used to transmit a positioning reference signal, receiving the reference signal at the UE, determining a receive beam for the UE to use to receive the positioning reference signal based on the received reference signal and the identified quasi co-location relationship, and receiving a positioning reference signal at the UE using the determined receive beam.

An apparatus for wireless communication at a UE is described. The apparatus may include a processor, memory in electronic communication with the processor, and instructions stored in the memory. The instructions may be executable by the processor to cause the apparatus to identify a quasi co-location relationship indicating that one or more antenna ports of a base station used to transmit a reference signal are quasi co-located with one or more antenna ports of the base station used to transmit a positioning reference signal, receive the reference signal at the UE, determine a receive beam for the UE to use to receive the positioning reference signal based on the received reference signal and the identified quasi co-location relationship, and receive a positioning reference signal at the UE using the determined receive beam.

Another apparatus for wireless communication at a UE is described. The apparatus may include means for identifying a quasi co-location relationship indicating that one or more antenna ports of a base station used to transmit a reference signal are quasi co-located with one or more antenna ports of the base station used to transmit a positioning reference signal, receiving the reference signal at the UE, determining a receive beam for the UE to use to receive the positioning reference signal based on the received reference signal and the identified quasi co-location relationship, and receiving a positioning reference signal at the UE using the determined receive beam.

A non-transitory computer-readable medium storing code for wireless communication at a UE is described. The code may include instructions executable by a processor to identify a quasi co-location relationship indicating that one or more antenna ports of a base station used to transmit a reference signal are quasi co-located with one or more antenna ports of the base station used to transmit a positioning reference signal, receive the reference signal at the UE, determine a receive beam for the UE to use to receive the positioning reference signal based on the received reference signal and the identified quasi co-location relationship, and receive a positioning reference signal at the UE using the determined receive beam.

In some examples of the method, apparatuses, and non-transitory computer-readable medium described herein, determining the receive beam for the UE to use to receive the positioning reference signal may include operations, features, means, or instructions for measuring a signal strength of the reference signal and the method further including identifying the receive beam based on the measured signal strength and the identified quasi co-location relationship.

Some examples of the method, apparatuses, and non-transitory computer-readable medium described herein may further include operations, features, means, or instructions for receiving system information that includes an indication of the quasi co-location relationship from the base station.

In some examples of the method, apparatuses, and non-transitory computer-readable medium described herein, the quasi co-location relationship is pre-configured.

Some examples of the method, apparatuses, and non-transitory computer-readable medium described herein may further include operations, features, means, or instructions for receiving a set of cell identifiers for cells that transmit positioning reference signals and monitoring for positioning reference signals from one or more of the cells based on the received set of cell identifiers.

In some examples of the method, apparatuses, and non-transitory computer-readable medium described herein, receiving the set of cell identifiers for the cells that transmit the positioning reference signals may include operations, features, means, or instructions for receiving a radio resource control (RRC) message, or system information, or a downlink control information (DCI), or a positioning protocol message, or a combination thereof, indicating the set of cell identifiers.

Some examples of the method, apparatuses, and non-transitory computer-readable medium described herein may further include operations, features, means, or instructions for receiving, at the UE, a second reference signal from a second cell and a third reference signal, determining a second receive beam and a third receive beam for the UE to use to receive positioning reference signals, receiving a second positioning reference signal using the determined second receive beam and a third positioning reference signal using the determined third receive beam and determining a position of the UE based on the received positioning reference signal, the received second positioning reference signal, and the received third positioning reference signal.

In some examples of the method, apparatuses, and non-transitory computer-readable medium described herein, the reference signal includes a synchronization signal, or a channel state indication reference signal (CSI-RS) for tracking, or a CSI-RS for beam management, or a CSI-RS for radio resource management, or a physical broadcast channel (PBCH) demodulation reference signal (DMRS), or a combination thereof.

In some examples of the method, apparatuses, and non-transitory computer-readable medium described herein, the reference signal may be a synchronization signal including a primary synchronization signal (PSS), or a secondary synchronization signal (SSS), or a combination thereof.

In some examples of the method, apparatuses, and non-transitory computer-readable medium described herein, the quasi co-location relationship includes a Doppler shift, or a Doppler spread, or an average delay, or a delay spread, or one or more spatial parameters, or a combination thereof.

A method of wireless communication at a base station is described. The method may include identifying a quasi co-location relationship indicating that one or more antenna ports of the base station used to transmit a reference signal are quasi co-located with one or more antenna ports of the base station used to transmit a positioning reference signal and transmitting an indication of the quasi co-location relationship.

An apparatus for wireless communication at a base station is described. The apparatus may include a processor, memory in electronic communication with the processor, and instructions stored in the memory. The instructions may be executable by the processor to cause the apparatus to identify a quasi co-location relationship indicating that one or more antenna ports of the base station used to transmit a reference signal are quasi co-located with one or more antenna ports of the base station used to transmit a positioning reference signal and transmit an indication of the quasi co-location relationship.

Another apparatus for wireless communication at a base station is described. The apparatus may include means for identifying a quasi co-location relationship indicating that one or more antenna ports of the base station used to transmit a reference signal are quasi co-located with one or more antenna ports of the base station used to transmit a positioning reference signal and transmitting an indication of the quasi co-location relationship.

A non-transitory computer-readable medium storing code for wireless communication at a base station is described. The code may include instructions executable by a processor to identify a quasi co-location relationship indicating that one or more antenna ports of the base station used to transmit a reference signal are quasi co-located with one or more antenna ports of the base station used to transmit a positioning reference signal and transmit an indication of the quasi co-location relationship.

Some examples of the method, apparatuses, and non-transitory computer-readable medium described herein may further include operations, features, means, or instructions for transmitting the reference signal and the positioning reference signal based on the transmitted indication of the quasi co-location relationship.

In some examples of the method, apparatuses, and non-transitory computer-readable medium described herein, the reference signal includes a synchronization signal, or a CSI-RS for tracking, or a CSI-RS for beam management, or a CSI-RS for radio resource management, or a PBCH, or a DMRS, or a combination thereof.

In some examples of the method, apparatuses, and non-transitory computer-readable medium described herein, the reference signal may be a synchronization signal including a PSS, or a SSS, or a combination thereof.

In some examples of the method, apparatuses, and non-transitory computer-readable medium described herein, transmitting the indication of the quasi co-location relationship may include operations, features, means, or instructions for transmitting a system information that includes the indication of the quasi co-location relationship.

Some examples of the method, apparatuses, and non-transitory computer-readable medium described herein may further include operations, features, means, or instructions for transmitting a set of cell identifiers for cells that transmit positioning reference signals.

In some examples of the method, apparatuses, and non-transitory computer-readable medium described herein, transmitting the set of cell identifiers for the cells that transmit the positioning reference signals may include operations, features, means, or instructions for transmitting a RRC message, or a DCI, or a positioning protocol message, or a combination thereof, indicating the set of cell identifiers.

In some examples of the method, apparatuses, and non-transitory computer-readable medium described herein, the quasi co-location relationship includes a Doppler shift, or a Doppler spread, or an average delay, or a delay spread, or one or more spatial parameters, or a combination thereof.

DETAILED DESCRIPTION

Figure 1:
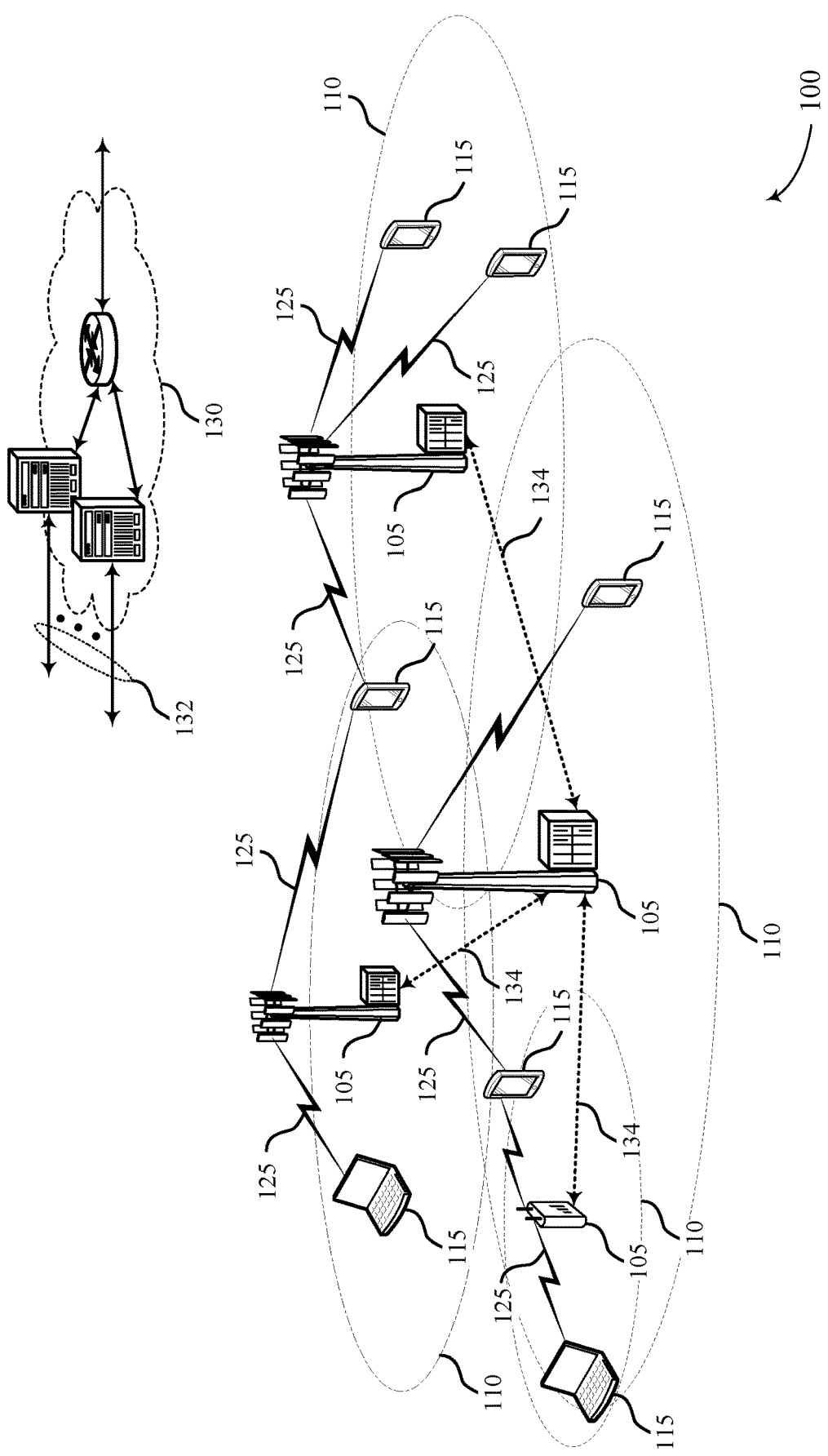
FIG. 1 illustrates an example of a system for wireless communication that supports downlink positioning reference signals in multi-beam systems in accordance with aspects of the present disclosure.

In some examples of a wireless communications system, such as a millimeter wave (mmW) system or new radio (NR) system, wireless communications devices may communicate via directional transmissions (e.g., beams), in which beamforming may be applied using multiple antenna elements to provide a beam in a particular direction. Such examples of a wireless communications system may support positioning services, which may utilize downlink-based positioning in a multi-beam system.

In some cases, supporting the downlink-based positioning in multi-beam systems may include a base station or cell sending a PRS over different transmit beams to meet base station or cell coverage requirements. It may also include the UE measuring the PRS from multiple base stations or cells (e.g., at least three) to support UE positioning. In some cases, a base station may be unaware of a particular location of a UE, such as when a gap in communications occurs while a UE is moving. When a base station does not know the direction in which to transmit to a UE, the base station may transmit to the UE by sweeping through a set of transmit beams focused in different directions, and transmitting data and/or reference signals (e.g., a PRS) on each of the beams. Additionally or alternatively, the UE may sweep through a set of receive beams in an attempt to locate and identify an ideal receive beam on which the UE may receive the signals the base station is transmitting. Sweeping through a set of beams several times may be costly in terms of time, power consumption, and resources. If a UE sweeps through multiple receive beams to receive one or more signals, including the PRSs, measurement latency at the UE may be high.

Alternatively, a base station may configure its antenna or antennas such that the antenna ports used to transmit reference signals (e.g., synchronization signals, channel state information reference signals (CSI-RS) for tracking or beam management, physical broadcast channel (PBCH) signals, demodulation reference signals (DRMS)) are spatially quasi co-located (QCL) with the antenna ports used to transmit PRS transmissions. When the reference signals and the PRSs are transmitted by antenna ports that are QCL, the UE can receive the two signals using the same receive beam. A base station may indicate the QCL configuration to the UE. The UE may receive reference signals and utilize the reference signals to determine a preferred receive beam. Additionally or alternatively, the UE may receive reference signals and utilize the reference signals to determine a preferred receive beam. Then, the UE may receive the PRS transmissions via the same preferred receive beam. Because the UE may receive the PRS without beam sweeping through multiple receive beams, the UE may save processing overhead and decrease measurement latency.

Aspects of the disclosure are initially described in the context of a wireless communications system. Aspects of the disclosure are also illustrated by and described with reference to process flow diagrams. Aspects of the disclosure are further illustrated by and described with reference to apparatus diagrams, system diagrams, and flowcharts that relate to downlink positioning reference signal in multi-beam systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110. In some cases, base stations 105 may communicate with one or more UEs 115 via highly directional transmissions (beams). Such directional transmissions may be performed via beam sweeping procedures, wherein base stations 105 and UEs 115 sweep through a series of directional beams to identify a preferred transmit beam and/or a preferred receive beam.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a base station 105 may transmit a reference signal (e.g., synchronization signals, CSI-RS for tracking or beam management, CSI-RS for radio resource management, PBCH signals, DRMS) to a UE 115. The UE 115 may also be aware of a quasi co-location relationship between antenna ports used to transmit the reference signal, and antenna ports used to transmit a PRS. The UE 115 may utilize the receive beam determined by receiving the reference signal to receive a PRS from base station 105. UE 115 may receive PRSs from multiple base stations 105 using such techniques in order to triangulate the position of UE 115 using three or more received PRSs.

Figure 2:
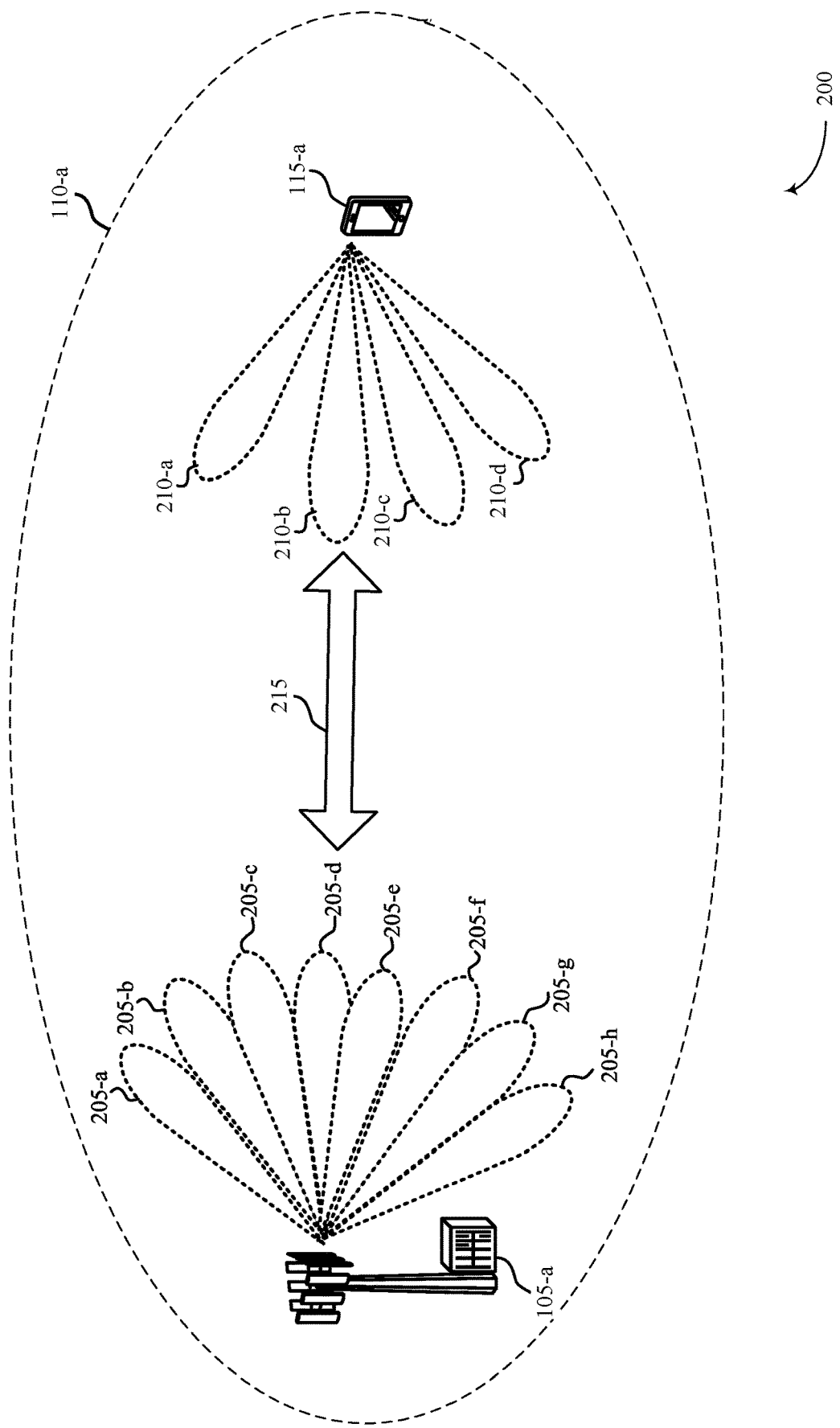
FIG. 2 illustrates an example of a wireless communications system that supports downlink positioning reference signals in multi-beam systems in accordance with aspects of the present disclosure.

FIG. 2 illustrates an example of a wireless communications system 200 that supports downlink positioning reference signals in multi-beam systems in accordance with various aspects of the present disclosure. In some examples, wireless communications system 200 may implement aspects of wireless communications system 100. Wireless communications system 200 may support millimeter wave (mmW) communication, new radio (NR) communications, LTE communication, or any other wireless communication. Wireless communications system 200 may include base station 105-a and UE 115-a, which may be examples of the corresponding devices described with reference to FIG. 1.

Base station 105-a may communicate with UE 115-a via directional transmissions (e.g., beams). In some examples, base station 105-a may provide services that utilize positioning support, or PRS. For example, emergency services may utilize PRS transmissions. Emergency services may include 911 calls, including E911 services, or other emergency communications. Location-based services may also utilize PRS transmissions, and may include map services, global positioning system (GPS) services, or navigation services. Additionally, some services are best utilized when accurate positioning is available (e.g., mission critical services, etc.). Wireless communications system 200 may support downlink-based positioning (e.g., UE-based positioning) or uplink based positioning (e.g., network-based positioning). In downlink-based positioning, base station 105-a may transmit a PRS on a downlink to support a positioning procedure. In cases wherein a base station 105-a and a UE 115-a support NR communications, base station 105-a may transmit a NR-PRS to support various services.

A wireless communications system (e.g., an NR system) may support single beam and/or multi-beam system operations. For example, a single beam may be enabled for frequency bands below 3 GHz. In some examples, multi-beam communications may be enabled for high frequency bands of 3 GHz or higher, including mmW frequencies. In examples wherein base station 105-a and UE 115-a utilize multi-beam communications, base station 105-a may determine a preferred transmit beam, and UE 115-a may determine a preferred receive beam, such that successful transmission and reception are likely at a given location of UE 115-a.

For example, to support applications that rely on positioning procedures, base station 105-a may engage in a beam sweeping procedure (e.g., transmitting PRSs on multiple directional beams 205, each directional beam 205 corresponding to an antenna port configuration that results in a different transmit direction) to identify the preferred transmit beam 205, and to satisfy any cell coverage or base station 105-a specific requirements. UE 115-a may engage in a beam sweeping procedure to identify the preferred receive beam 210. UE 115-a may receive PRSs from base station 105-a, and other base stations 105 (e.g., at least three total base stations) and may measure the received PRSs to support positioning procedures. In some cases, UE 115-a may have no knowledge of a preferred receive beam on which to receive a PRS. In such examples, UE 115-a may engage in beam sweeping procedures (e.g., receiving PRSs on multiple directional beams 210, each directional beam 210 corresponding to an antenna port configuration that results in a different receive direction). UE 115-a and base station 105-a may identify a preferred transmit beam 205 (e.g., transmit beam 205-d) and a preferred receive beam 210 (e.g., receive beam 210-b) on which to communicate current and/or subsequent transmissions.

In some cases, UE 115-a may be mobile, and may reposition before or during communication. In such examples, base station 105-a may consider the number of receive beams that UE 115-a utilizes to measure received signals, resulting in multiple iterations of a beam sweeping procedure. That is, base station 105-a may be configured to use a number of transmit beams 205 (e.g., 8 transmit beams). Base station 105-a may also be aware that UE 115-a is configured to use a number of receive beams 210 (e.g., 4 receive beams). In such cases, base station 105-a may perform multiple beam sweeping iterations, for example sweeping through transmit beams 205 four times (one for each of receive beams 210-a through 210-d). Thus, base station 105-a may transmit a broadcast or reference signal 32 times (8 transmit beams times 4 receive beams) to identify a preferred transmit/receive beam pair 215. Or, as another example, if base station 105-a has 64 different transmit beams 205 and UE 115-a has four receive beams 210, then base station 105-a may transmit a broadcast or reference signal as many as 256 times to identify a preferred transmit/receive beam pair 215. Such examples may lead to excessive processing and resource overhead at base station 105-a. Because UE 115-a may beam sweep via multiple receive beams 210, UE 115-a may suffer from high processing overhead and increased measurement latency.

Alternatively, base station 105-a and UE 115-a may utilize antenna port positioning to increase the efficiency of downlink PRS transmissions in a multi-beam system. For example, base station 105-a may be configured to utilize quasi co-located (QCL) antenna ports for transmission of more than one kind of signal, such as synchronization signals, broadcast signals, reference signals, or other signals. Two antenna ports (or two sets of antenna ports) may be quasi co-located if properties of the channel over which a symbol on one antenna port is conveyed can be inferred from the channel over which a symbol on the other antenna port is conveyed. Channel properties included in a quasi co-location relationship may include reference signal, such as Doppler shift, Doppler spread, average delay, average delay spread, spatial parameters, or the like. For example, if a measured value for a parameter of the channel for the one antenna port (or set of antenna ports) is within a threshold value of a measured value for the parameter of the channel for the second antenna port (or set of antenna ports), then the two antenna ports (or two sets of antenna ports) are considered to be QCL. That is, if a first signal is transmitted utilizing a first antenna port that is QCL with a second antenna port that is utilized to transmit a second signal, then the first signal and the second signal may be transmitted/ received via the same transmit beam 205 and receive beam 210. If UE 115-*a* knows that a PRS is transmitted via antenna ports that are QCL with antenna ports used to transmit a synchronization signal, then UE 115-*a* may determine a preferred receive beam 210-*b* by monitoring and measuring the synchronization signal and may use the same preferred receive beam 210-*b* to receive the PRS signal (without repeating a receive beam sweeping procedure). Although the following examples refer to a QCL relationship between synchronization signals and PRS signals, the non-limiting examples described below may also refer to other reference signals (e.g., synchronization signals, CSI-RS for tracking or beam management, PBCH signals, DRMS). Whether antenna ports or sets of antenna ports may be considered to be QCL may in some cases be subject to configuration or pre-configuration by a network operator.

In some examples, base station 105-*a* may configure transmit/receive antennas such that the antenna port(s) used to transmit reference signals (e.g., PRS) may be spatially QCL with the antenna port(s) used to transmit broadcast signals such as broadcast signals or reference signals. In some cases, broadcast signals or reference signals may be NR synchronization signals, such as PSS (e.g., NR-PSS), SSS (e.g., NR-SSS) and PBCH DMRS (e.g., NR-PBCH DMRS). Synchronization signals may be utilized in any RRC state (e.g., RRC-idle, or RRC-connected). In some cases, broadcast signals or reference signals may be signals utilized for beam and mobility management, such as CSI-RS. CSI-RS may be utilized in an RRC-connected state.

In some examples, base station 105-*a* may transmit an indication of the QCL antenna ports to UE 115-*a*. In some examples, the indication may be transmitted via higher layer signaling (e.g., RRC signaling). In some examples, the indication may be included in one or more system information blocks (SIBs). In still other examples, the indication may be included in a random mobile subscriber identify (RMSI), an other system information block (OSIB), or another system information transmission. Additionally or alternatively, UE 115-*a* may be pre-configured to identify a QCL configuration at base station 105-*a*.

In some examples, base station 105-*a* may beam sweep a reference or broadcast signal (e.g., a synchronization signal) via transmit beams 205-*a* through 205-*h*, for each of receive beams 210-*a* through 210-*d*. UE 115-*a* may monitor and measure the synchronization signals from base station 105-*a*. UE 115-*a* may measure only one kind of synchronization signal (e.g., NR-SSS only or NR-DMRS), or may measure more than one kind of synchronization signal (e.g., both NR-SSS and NR-DMRS). UE 115-*a* may determine whether to measure only one synchronization signal or more than one synchronization signal based on whether UE 115-*a* is performing a reselection. In some examples, UE 115-*a* may engage in a procedure that benefits from monitoring and measuring reference or broadcast signals (e.g., synchronization signals) from base station 105-*a*, and thus minimal or no additional processing overhead or delay is incurred by measuring and monitoring the synchronization signal. Having monitored and measured the synchronization signal, UE 115-*a* may identify a preferred receive beam (e.g., receive beam 210-*b*). UE 115-*a* may also know that base station 105-*a* has been configured such that the antenna ports used to transmit NR-PRS are spatially QCL with the antenna ports used to transmit NR broadcast signals or NR reference signals. Thus, UE 115-*a* may determine that the preferred receive beam 205-*b* is the preferred receive beam to receive PRS from base station 105-*a*.

Base station 105-*a* may transmit one or more PRSs to UE 115-*a*. In some examples, base station 105-*a* may beam sweep the PRSs via transmit beams 205 *a* through 205-*h*. UE 115-*a* may receive the PRSs via preferred receive beam 210-*b*. In some examples, UE 115-*a* may not engage in a beam sweeping procedure to identify a preferred receive beam 210, because UE 115-*a* has already identified preferred receive beam 210-*b*, and is aware that base station 105-*a* will transmit the PRSs via antenna ports that are QCL with the antenna ports used to transmit the previously received synchronization signals. Thus, base station 105-*a* may transmit the PRS once on each of transmit beams 205 *a* through 205-*h*, instead of transmitting the PRS multiple times on each of the transmit beams 205 to identify a preferred receive beam 210. Because UE 115-*a* may not have any reason to monitor PRSs on multiple receive beams 210, UE 115-*a* may save processing overhead and reduce measurement latency.

Some devices within coverage area 110 may not support certain types of PRS (e.g., NR-PRS). In such examples, a network may indicate which cells support NR-PRS transmissions. Such signaling may be done via RRC messaging or system information or downlink control information (DCI) transmissions. The signal type may be determined based on whether UE 115-*a* is in an RRC-connected state, or may be based on a positioning related protocol. In such examples, UE 115-*a* may utilize the indication to manage NR-PRS measurements. Base station 105-*a* may utilize the indication to only transmit NR-PRSs to certain cells. For example, base station 105-*a* may transmit NR-PRS to only certain cells based on NR-PRS interference, whether certain devices support NR-PRS transmissions, power saving, cell load, or other issues regarding UE positioning performance. For instance, UE 115-*a* may be notified that cells with even cell ID numbers may support PRS transmission, and cells with odd cell IDs may not support PRS transmission.

Figure 3:
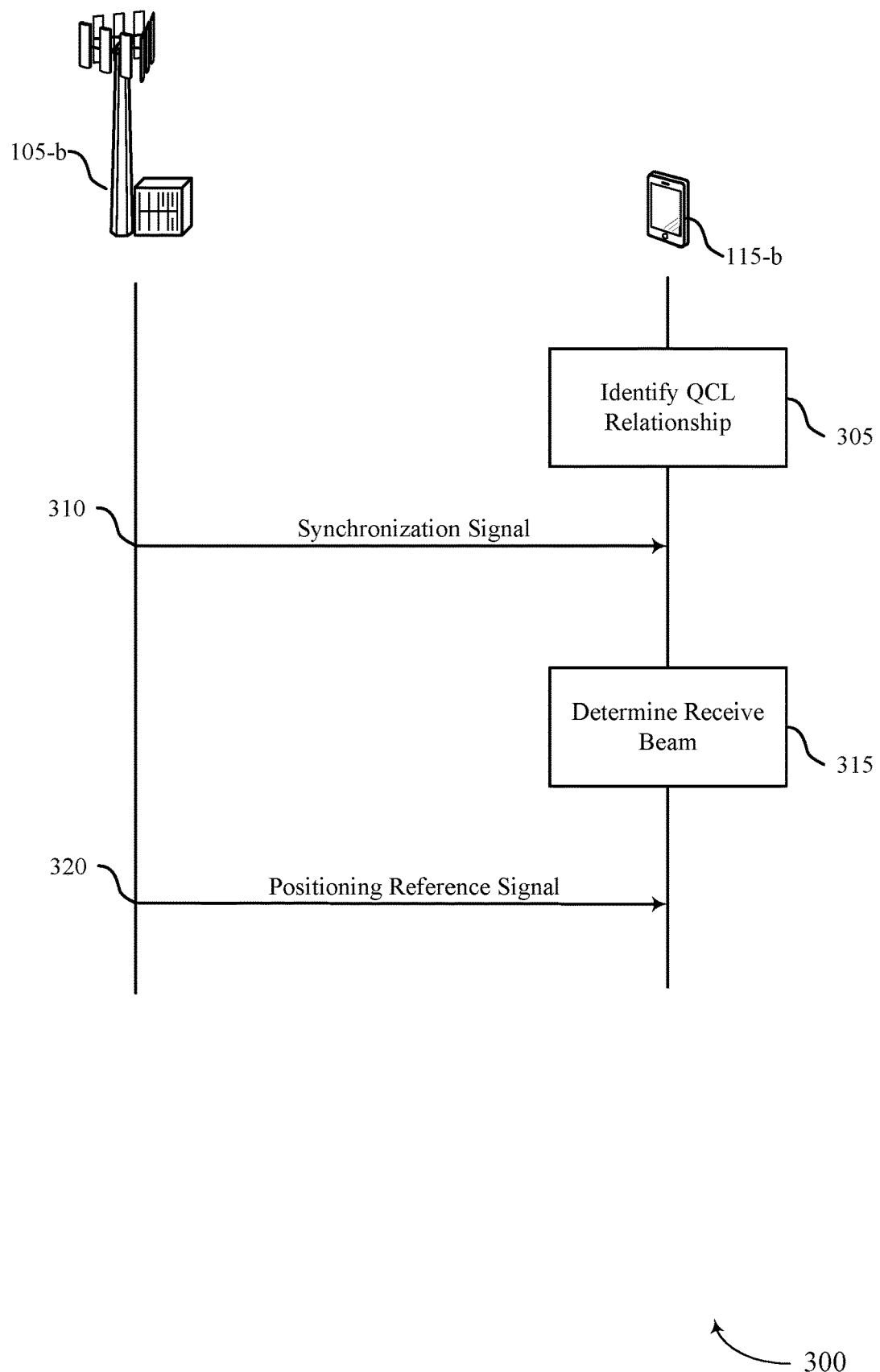
FIG. 3 illustrates an example of a process flow that supports downlink positioning reference signals in multi-beam systems in accordance with aspects of the present disclosure.

FIG. 3 illustrates an example of a process flow 300 that supports downlink positioning reference signals in multi-beam systems in accordance with various aspects of the present disclosure. In some examples, process flow 300 may implement aspects of wireless communications systems 100 and 200. Process flow 300 may include base station 105-*b* and UE 115-*b*, which may be examples of the corresponding devices described with reference to FIGS. 1 and 2.

In the following description of the process flow 300, the operations between the UE 115-*b* and the base station 105-*b* may be transmitted in a different order than the exemplary order shown, or the operations performed by UE 115-*b* and the base station 105-*b* may be performed in different orders or at different times. Certain operations may also be left out of the process flow 300, or other operations may be added to the process flow 300.

In some aspects, process flow 300 illustrates one example where the antenna ports (e.g., antenna port configurations) used to transmit synchronization signal(s) and the antenna ports used to transmit positioning reference signal(s) are QCL. Prior to listening for the positioning reference signal(s), UE 115-*b* may listen for the synchronization signal(s) or reference signal(s) that are QCL with the PRS. The UE 115-*b* may find or otherwise determine its best receive (RX) beam(s) for the transmitted synchronization signal(s) and use this as its selected RX beam(s) to receive the reference signals. At 305, UE 115-*b* may identify a QCL relationship indicating that antenna ports of a base station used to transmit synchronization signals are quasi co-located with antenna ports of the base station used to transmit positioning reference signals.

At 310, base station 105-b may transmit and UE 115-b may receive a synchronization signal. The synchronization signal may be transmitted using a first antenna port configuration. Examples of the synchronization signal include, but are not limited to, a primary synchronization signal (PSS), a secondary synchronization signal (SSS), a beam reference signal (BRS), a tertiary synchronization signal (TSS), a mobility reference signal, a PBCH signal, CSI-RS, and the like. Each synchronization signal discussed may also be NR synchronization signals (e.g., NR-PSS, NR-SSS, NR-PBCH, etc.). The synchronization signal may be transmitted over the PBCH, or similar channel associated with synchronization operations. The synchronization signal may be transmitted in a beamformed transmission (e.g., a first beamformed transmission) from base station 105-b. The synchronization signals may be used in any radio resource control (RCC) state (e.g., RRC-Idle and RRC-Connected). CSI-RS may be used for beam management and may be used in RRC-Connected states.

At 315, UE 115-b may determine a receive beam for UE 115-b to use to receive a PRS based at least in part on the received synchronization signal and the identified QCL relationship. This is in accordance with steps described herein. In some aspects, the an indication may be received prior to 305, which may contain or otherwise convey information associated with the antenna port configuration used to transmit the synchronization signal. For example, the synchronization signal may contain or otherwise convey a beam index, antenna port(s) identification information, timing information, and the like. Accordingly, a UE (such as UE 115-b) receiving the synchronization signal may be able to identify or otherwise determine the first antenna port configuration.

In some aspects, the antenna ports used to transmit the synchronization signal may also be QCL with antenna port(s) used to transmit a reference signals that can be used to demodulate the PRC.

At 320, UE 115-b receives from base station 105-b a PRS using the receive beam determined at 315. Because the UE 115-b utilizes the receive beam determined at 315, instead of engaging in additional beam sweeping, UE 115-b may reduce processing overhead and measurement latency. Furthermore, base station 105-b may reduce processing overhead because it only has to engage in a single beam sweep, instead of a beam sweep for each possible receive beam.

Figure 4:
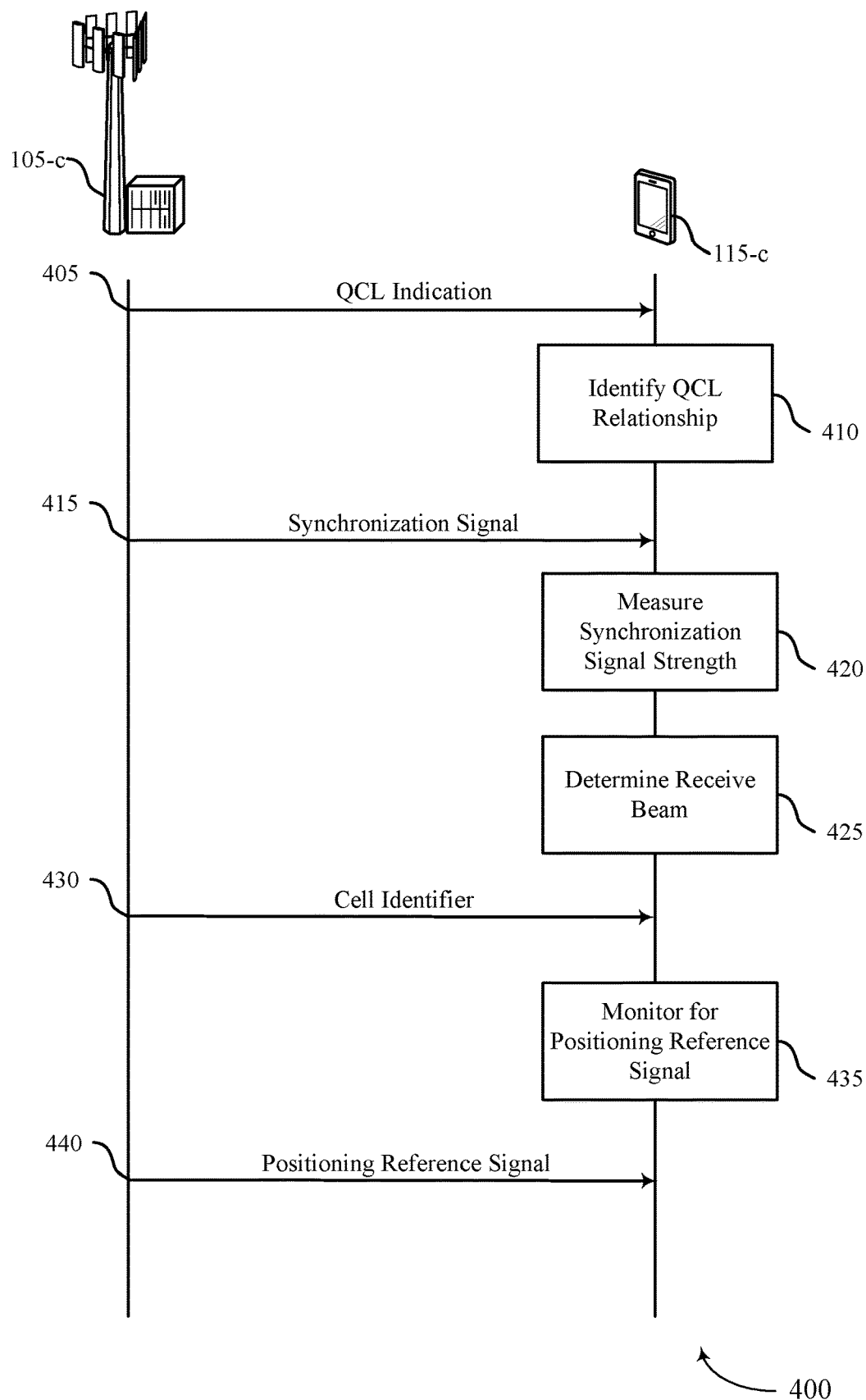
FIG. 4 illustrates an example of a process flow that supports downlink positioning reference signals in multi-beam systems in accordance with aspects of the present disclosure.

FIG. 4 illustrates an example of a process flow 400 that supports downlink positioning reference signals in multi-beam systems in accordance with various aspects of the present disclosure. In some examples, process flow 400 may implement aspects of wireless communications systems 100 and/or 200. In some examples, process flow 400 may include base station 105-c and UE 115-c, which may be examples of the corresponding devices described with reference to FIGS. 1-3.

In the following description of the process flow 400, the operations between the UE 115-c and the base station 105-c may be transmitted in a different order than the exemplary order shown, or the operations performed by UE 115-c and the base station 105-c may be performed in different orders or at different times. Certain operations may also be left out of the process flow 400, or other operations may be added to the process flow 400.

At 405, UE 115-c may receive an indication of the QCL relationship from base station 105-c. Base station 105-c may transmit an indication that it is using QCL antenna ports where the antenna port(s) used to transmit the synchronization and/or reference signal are QCL with the antenna port(s) used to transmit the positioning reference signal. Base station 105-c may transmit the indication in a system information transmission which includes a SIB, or a RMSI, or an OSIB, or a combination thereof. Thus, UE 115-c may know that QCL antenna ports are being used in positioning reference signal transmissions from base station 105-c.

In some examples, base station 105-c may transmit a reference signal, where the identified QCL relationship further indicates that antenna ports of base station 105-c used to transmit the reference signal are quasi co-located with antenna ports of base station 105-c used to transmit the positioning reference signal. Examples of the transmitted reference signal include a PBCH DMRS, or a CSI-RS, or a combination thereof.

In some aspects, the indication may be carried in different carriers than are used for the synchronization signal and/or paging signal. For example, base station 105-c may transmit the indication via an LTE/LTE-A and/or NR network (e.g., sub-6 GHz network) and then the synchronization signals and/or paging signals may be transmitted over a mmW wireless network (e.g., in a beamformed transmission).

At 410, UE 115-c may identify a QCL relationship indicating that antenna ports of base station 105-c used to transmit synchronization signals are quasi co-located with antenna ports of base station 105-c used to transmit positioning reference signals. This identification of a QCL relationship may be based on the indication transmitted in 405.

At 415, base station 105-c may transmit and UE 115-c may receive a synchronization signal. This may be similar to 310 in FIG. 3. In addition, a second base station 105 (not shown) may transmit a second synchronization signal and a third base station 105 (also not shown) may transmit a third synchronization signal, all received by UE 115-c.

At 420, UE 115-c may measure a signal strength of the synchronization signal received in 415. At 425, UE 115-c may determine a receive beam for UE 115-c to use to receive a PRS based at least in part on the received synchronization signal and the identified quasi co-location relationship. The identified quasi co-location relationship may include channel properties, such as Doppler shift, Doppler spread, average delay, average delay spread, spatial parameters, or the like. The identification of the receive beam may be based in part on the synchronization signal strength measured in 420. UE 115-c may determine a second receive beam and a third receive beam for UE 115-c to use to receive positioning reference signals.

At 430, base station 105-c may transmit (and UE 115-c may receive) a set of cell identifiers for cells that transmit positioning reference signals. Receiving the set of cell identifiers may include receiving a RRC message, or system information, or a DCI, or a positioning protocol message, or a combination thereof, indicating the set of cell identifiers.

At 435, UE 115-c may monitor for positioning reference signals from one or more of the cells based at least in part on the received set of cell identifiers received in 430. UE 115-c may perform procedures such as cell reselection (e.g., in RRC-Idle), mobility (e.g., in RRC-Connected), or beam management procedures. As a result, UE 115-c may have knowledge of the positioning reference signals. Thus, UE 115-c may perform positioning procedures without additional processing overhead.

At 440, UE 115-c may receive a PRS from base station 105-c using the receive beam determined at 425. UE 115-c may additionally receive a second positioning reference signal using the determined second receive beam and a third positioning reference signal using the determined third receive beam. UE 115-*c* may determine a position of UE 115-*c* based at least in part on the received positioning reference signals.

Figure 5:
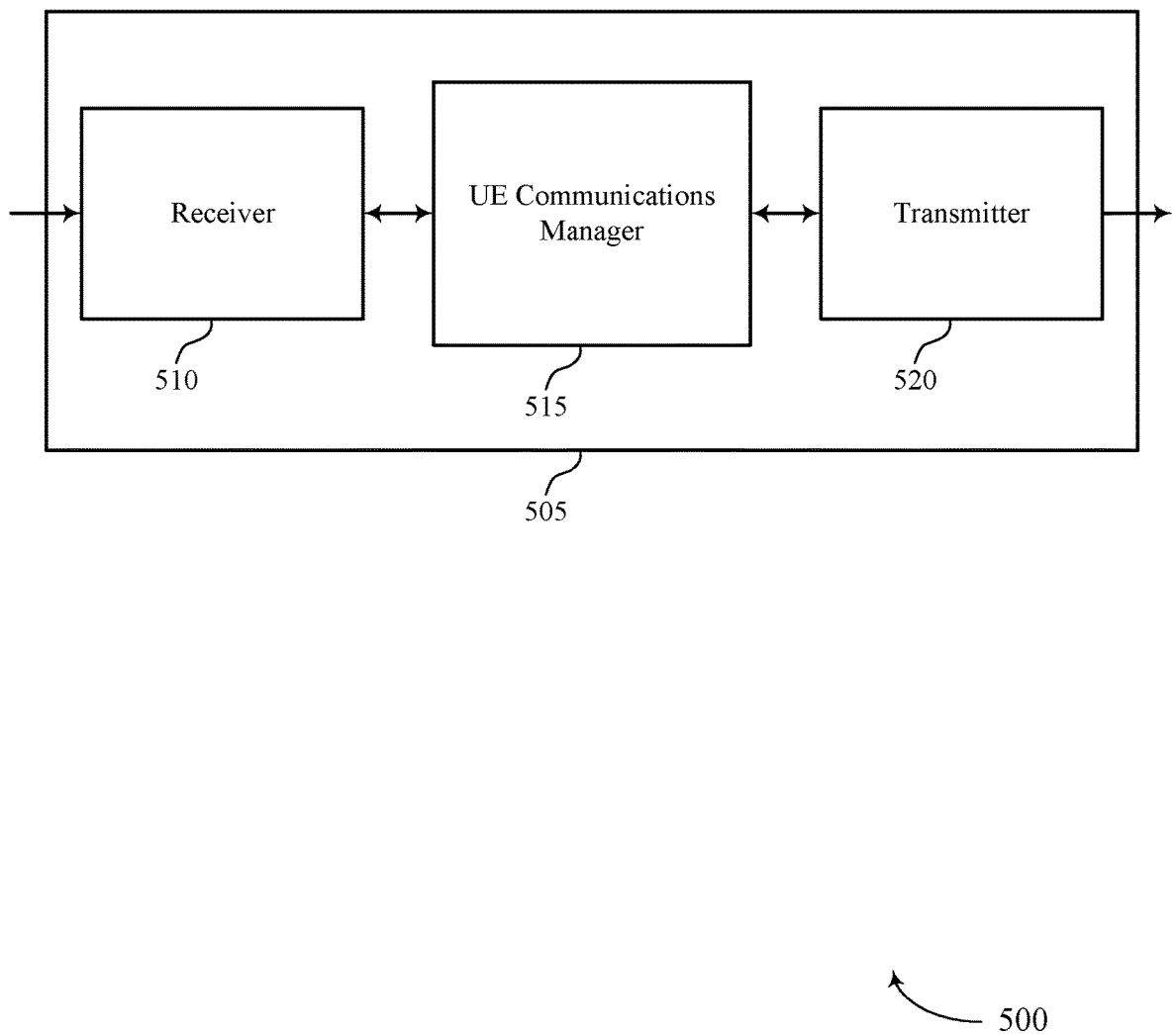
FIGS. 5 through 7 show block diagrams of a device that supports downlink positioning reference signals in multi-beam systems in accordance with aspects of the present disclosure.

FIG. 5 shows a block diagram 500 of a wireless device 505 that supports downlink positioning reference signals in multi-beam systems in accordance with aspects of the present disclosure. Wireless device 505 may be an example of aspects of a user equipment (UE) 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to downlink positioning reference signal in multi-beam systems, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a quasi co-location relationship indicating that antenna ports of a base station used to transmit a reference signal are quasi co-located with antenna ports of the base station used to transmit a positioning reference signal, receive the reference signal at the UE, determine a receive beam for the UE to use to receive the positioning reference signal based on the received reference signal and the identified quasi co-location relationship, and receive a positioning reference signal at the UE using the determined receive beam.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
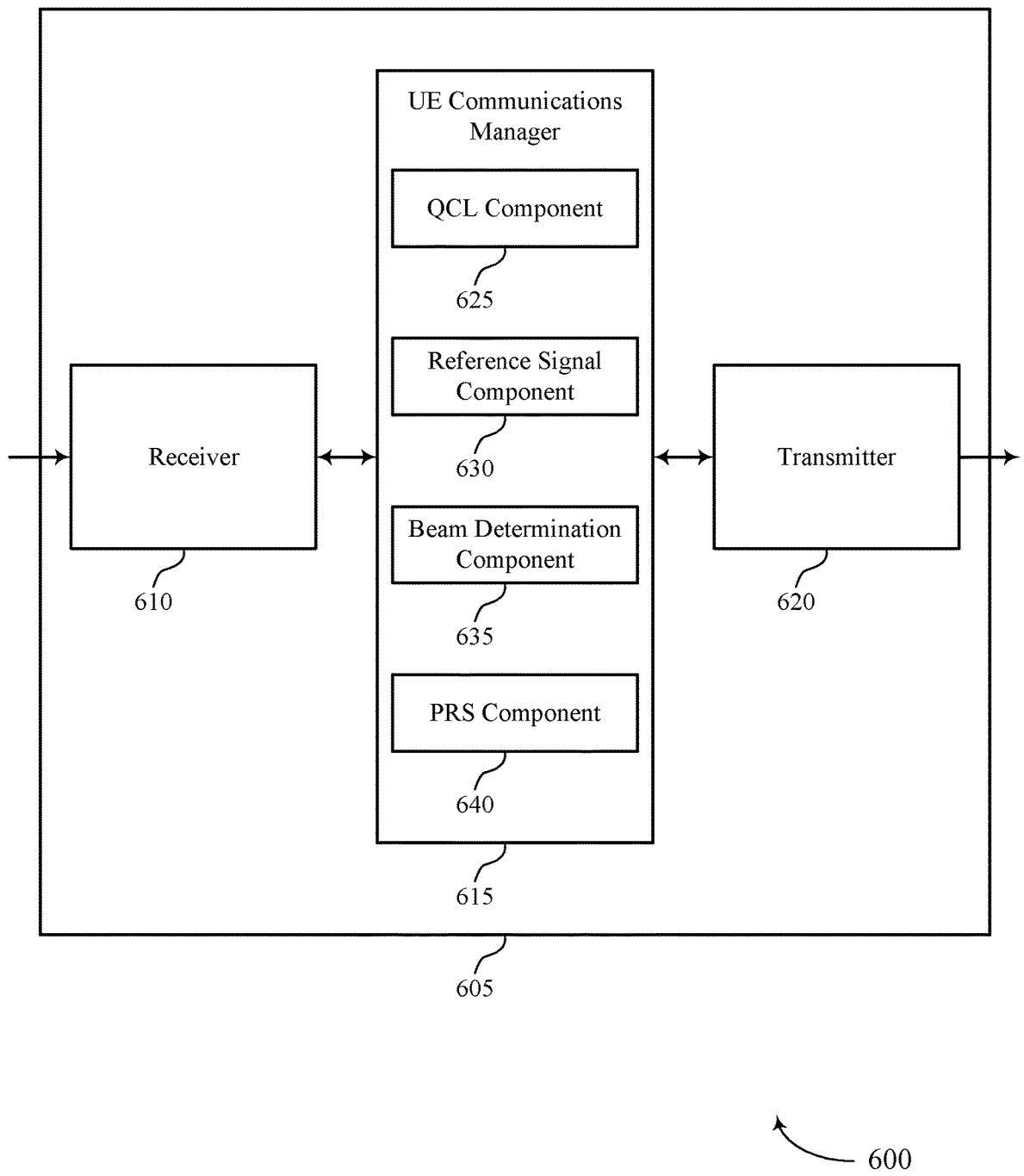

FIG. 6 shows a block diagram 600 of a wireless device 605 that supports downlink positioning reference signals in multi-beam systems in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to downlink positioning reference signal in multi-beam systems, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include QCL component 625, reference signal component 630, beam determination component 635, and PRS component 640.

QCL component 625 may identify a quasi co-location relationship indicating that antenna ports of a base station used to transmit a reference signal are quasi co-located with antenna ports of the base station used to transmit a positioning reference signal and receive an indication of the quasi co-location relationship from the base station. In some cases, receiving the indication of the quasi co-location relationship may include receiving a system information transmission that includes the indication of the quasi co-location relationship, the system information transmission including a SIB, or a RMSI, or an other system information block (OSIB), or a combination thereof. In some examples, the quasi co-location relationship comprises a Doppler shift, or a Doppler spread, or an average delay, or a delay spread, or one or more spatial parameters, or a combination thereof.

Reference signal component 630 may receive the reference signal at the UE and receive, at the UE, a second reference from a second cell and a third reference signal from a third cell. In some cases, the reference signal includes a PSS, or a SSS, or a combination thereof.

Beam determination component 635 may determine a receive beam for the UE to use to receive the positioning reference signal based on the received reference signal and the identified quasi co-location relationship, identify the receive beam based on the measured signal strength and the identified quasi co-location relationship, and determine a second receive beam and a third receive beam for the UE to use to receive positioning reference signals. In some cases, determining the receive beam for the UE to use to receive the positioning reference signal may include measuring a signal strength of the reference signal.

PRS component 640 may receive a positioning reference signal at the UE using the determined receive beam, receive a second positioning reference signal using the determined second receive beam and a third positioning reference signal using the determined third receive beam, and determine a position of the UE based on the received positioning reference signal, the received second positioning reference signal, and the received third positioning reference signal.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
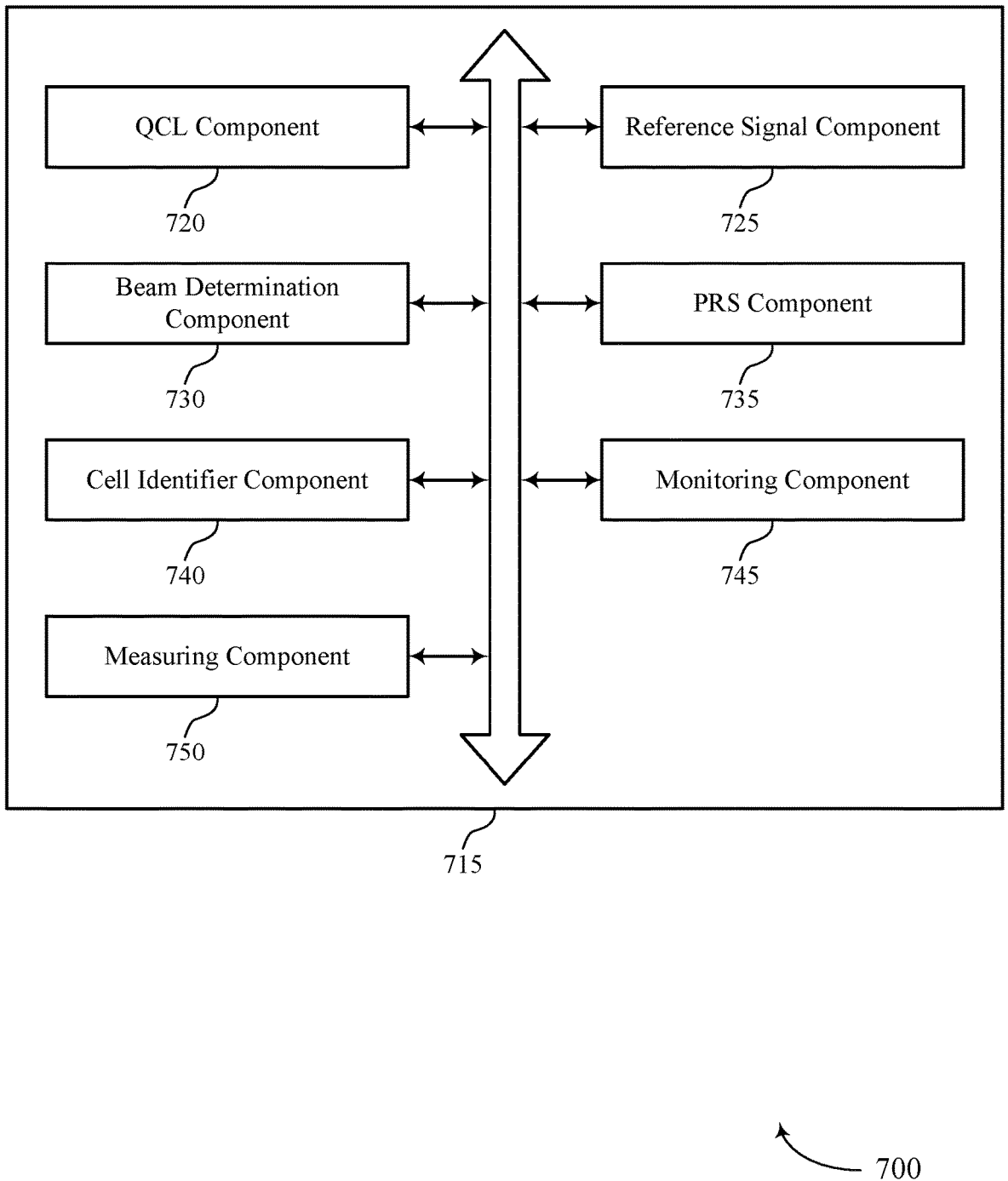

FIG. 7 shows a block diagram 700 of a UE communications manager 715 that supports downlink positioning reference signals in multi-beam systems in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include QCL component 720, reference signal component 725, beam determination component 730, PRS component 735, cell identifier component 740, monitoring component 745, and measuring component 750. Each of these modules may communicate, directly or indirectly, with one another (e.g., via one or more buses).

QCL component 720 may identify a quasi co-location relationship indicating that antenna ports of a base station used to transmit a synchronization signal are quasi co-located with antenna ports of the base station used to transmit a positioning reference signal and receive an indication of the quasi co-location relationship from the base station. In some cases, receiving the indication of the quasi co-location relationship may include receiving a system information transmission that includes the indication of the quasi co-location relationship, the system information transmission including a SIB, or a RMSI, or an OSIB, or a combination thereof. In some examples, the quasi co-location relationship comprises a Doppler shift, or a Doppler spread, or an average delay, or a delay spread, or one or more spatial parameters, or a combination thereof.

Reference signal component 725 may receive the reference signal at the UE and receive, at the UE, a second reference signal from a second cell and a third reference signal from a third cell. A synchronization signal may be an example of the reference signal. In some examples, the reference signal may comprise a synchronization signal, or a CSI-RS for tracking, or a CSI-RS for beam management, or a CSI-RS for radio resource management, or a PBCH DMRS, or a CSI-RS, or a combination thereof. In some cases, the synchronization signal includes a PSS, or a SSS, or a combination thereof.

Beam determination component 730 may determine a receive beam for the UE to use to receive the positioning reference signal based on the received synchronization signal and the identified quasi co-location relationship, identify the receive beam based on the measured signal strength and the identified quasi co-location relationship, and determine a second receive beam and a third receive beam for the UE to use to receive positioning reference signals. In some cases, determining the receive beam for the UE to use to receive the positioning reference signal may include measuring a signal strength of the synchronization signal.

PRS component 735 may receive a positioning reference signal at the UE using the determined receive beam, receive a second positioning reference signal using the determined second receive beam and a third positioning reference signal using the determined third receive beam, and determine a position of the UE based on the received positioning reference signal, the received second positioning reference signal, and the received third positioning reference signal.

Cell identifier component 740 may receive a set of cell identifiers for cells that transmit positioning reference signals. In some cases, receiving the set of cell identifiers for the cells that transmit the positioning reference signals may include receiving a RRC message, or system information, or a DCI, or a positioning protocol message, or system information, or a combination thereof, indicating the set of cell identifiers.

Monitoring component 745 may monitor for positioning reference signals from one or more of the cells based on the received set of cell identifiers. Measuring component 750 may measure a reference signal received at the UE, where determining the receive beam for the UE to use to receive the positioning reference signal is further based on the measured reference signal. In some cases, the measured reference signal includes a PBCH DMRS, or a channel state indication reference signal CSI-RS, or a combination thereof.

Figure 8:
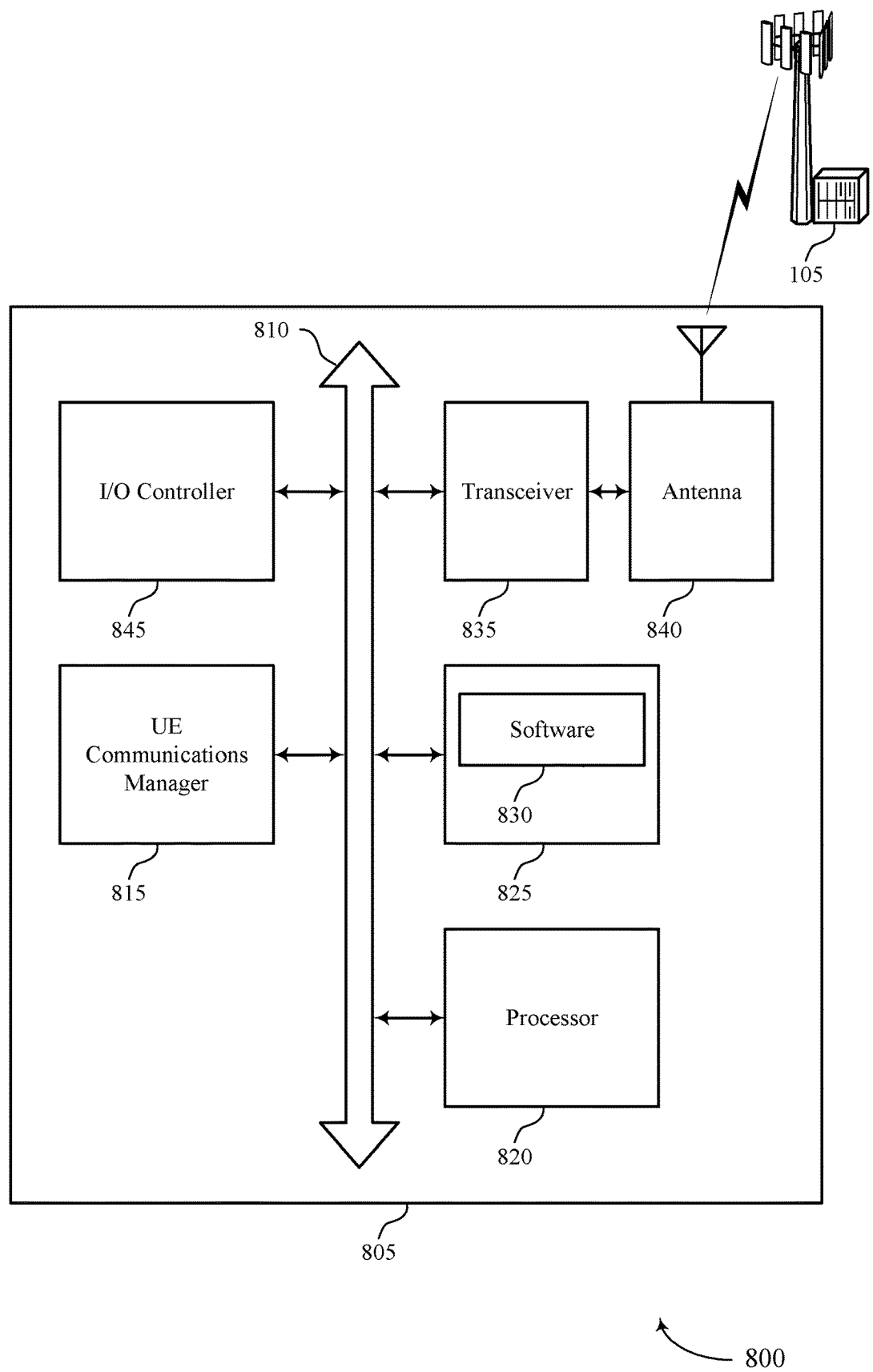
FIG. 8 illustrates a block diagram of a system including a UE that supports downlink positioning reference signals in multi-beam systems in accordance with aspects of the present disclosure.

FIG. 8 shows a diagram of a system 800 including a device 805 that supports downlink positioning reference signals in multi-beam systems in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting downlink positioning reference signal in multi-beam systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support downlink positioning reference signal in multi-beam systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
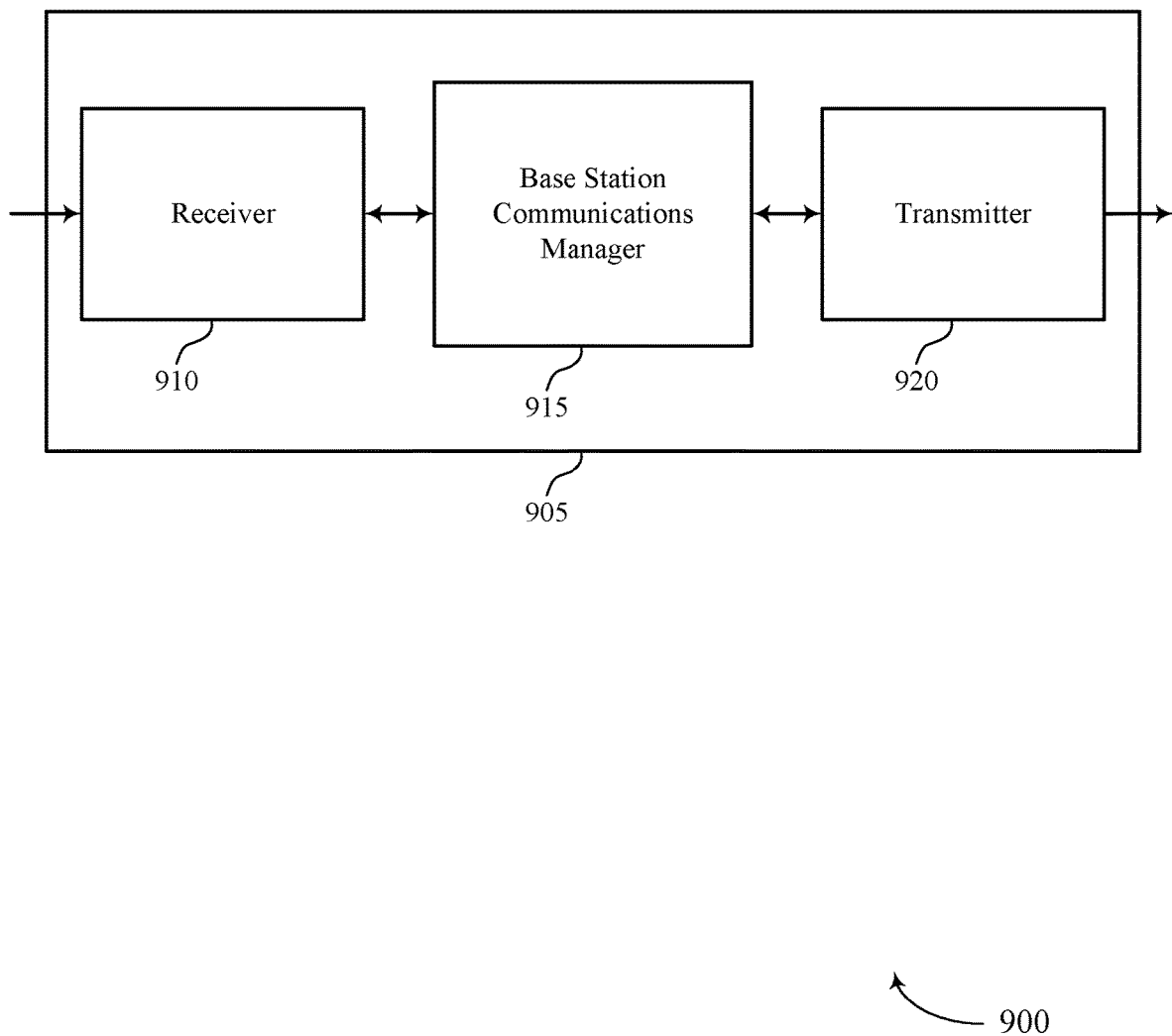
FIGS. 9 through 11 show block diagrams of a device that supports downlink positioning reference signals in multi-beam systems in accordance with aspects of the present disclosure.

FIG. 9 shows a block diagram 900 of a wireless device 905 that supports downlink positioning reference signals in multi-beam systems in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to downlink positioning reference signal in multi-beam systems, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify a quasi co-location relationship indicating that antenna ports of the base station used to transmit a synchronization signal are quasi co-located with antenna ports of the base station used to transmit a positioning reference signal and transmit an indication of the quasi co-location relationship. In some examples, the quasi co-location relationship comprises a Doppler shift, or a Doppler spread, or an average delay, or a delay spread, or one or more spatial parameters, or a combination thereof.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
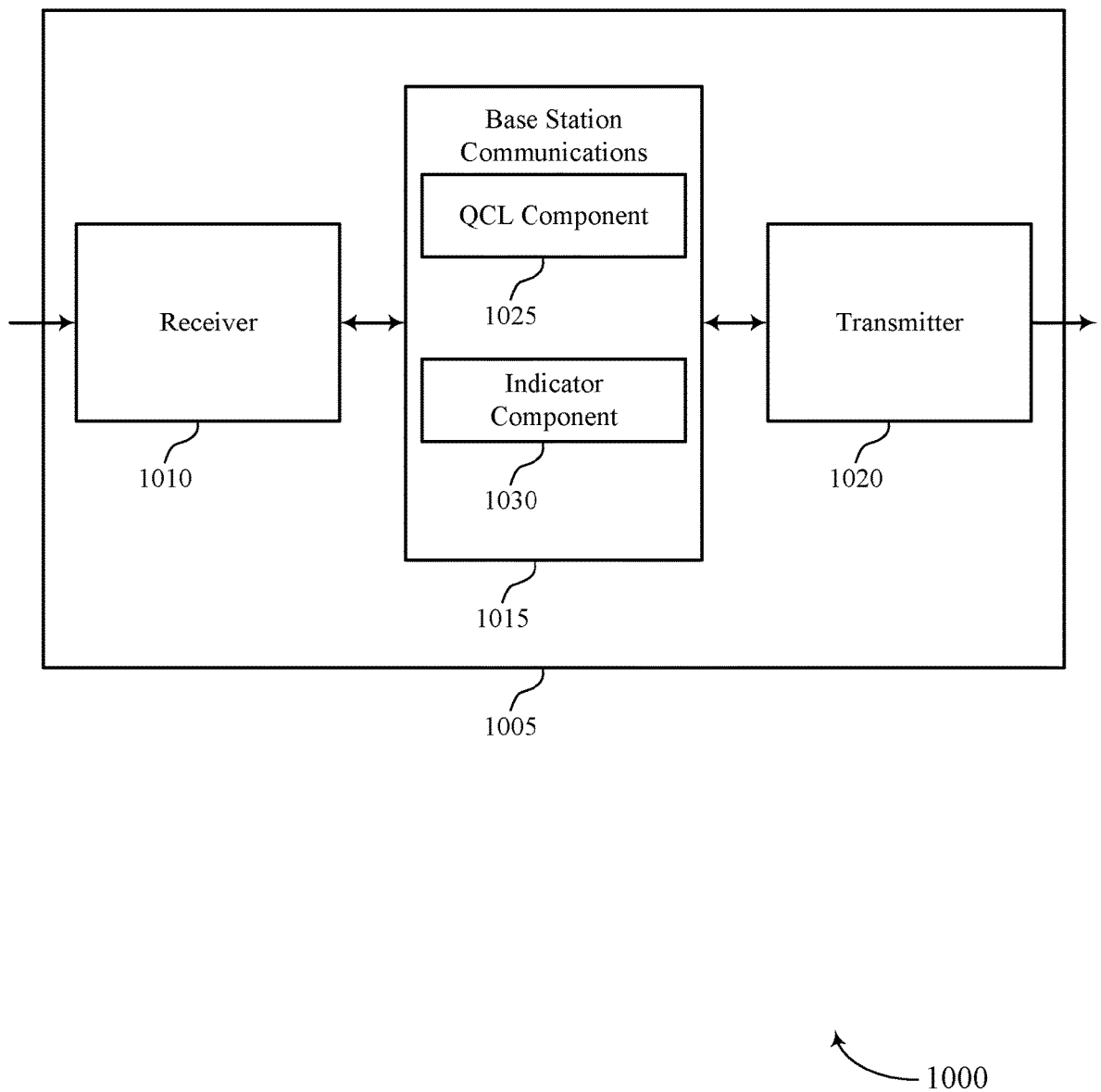

FIG. 10 shows a block diagram 1000 of a wireless device 1005 that supports downlink positioning reference signals in multi-beam systems in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to downlink positioning reference signal in multi-beam systems, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include QCL component 1025 and Indicator component 1030. QCL component 1025 may identify a quasi co-location relationship indicating that antenna ports of the base station used to transmit a synchronization signal are quasi co-located with antenna ports of the base station used to transmit a positioning reference signal. Indicator Component 1030 may transmit an indication of the quasi co-location relationship, and transmit a reference signal, where the identified quasi co-location relationship further indicates that antenna ports of the base station used to transmit the reference signal are quasi co-located with antenna ports of the base station used to transmit the positioning reference signal. In some cases, transmitting the indication of the quasi co-location relationship includes transmitting a system information transmission that includes the indication of the quasi co-location relationship, the system information transmission including a SIB, or a RMSI, or an OSIB, or a combination thereof. In some cases, the transmitted reference signal includes a PBCH DMRS, or a CSI-RS, or a combination thereof. In some examples, the quasi co-location relationship comprises a Doppler shift, or a Doppler spread, or an average delay, or a delay spread, or one or more spatial parameters, or a combination thereof.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
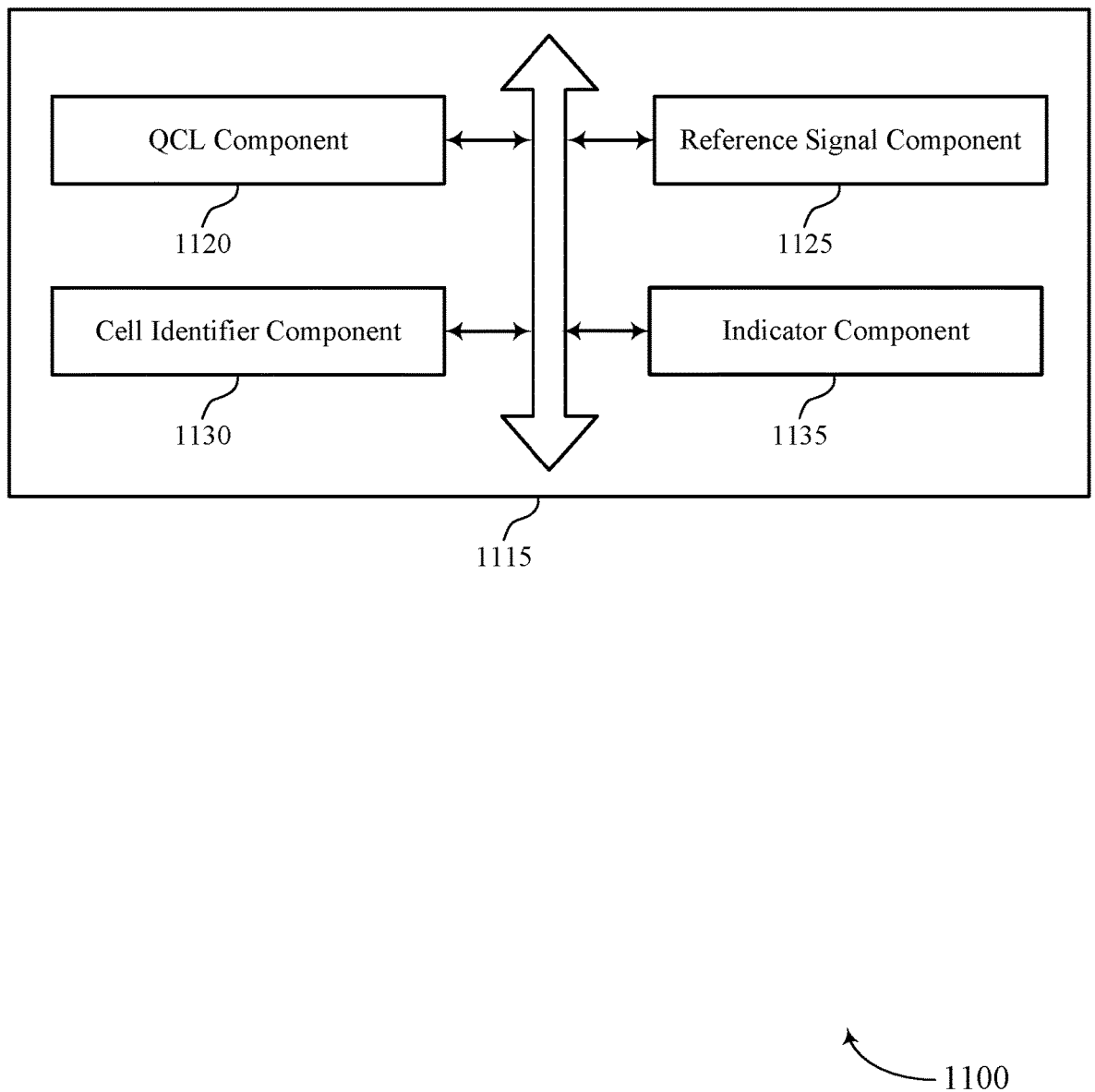

FIG. 11 shows a block diagram 1100 of a base station communications manager 1115 that supports downlink positioning reference signals in multi-beam systems in accordance with aspects of the present disclosure. The base station communications manager 1115 may be an example of aspects of a base station communications manager 1215 described with reference to FIGS. 9, 10, and 12. The base station communications manager 1115 may include QCL component 1120, reference signal component 1125, Indicator Component 1135, and cell identifier component 1130. Each of these modules may communicate, directly or indirectly, with one another (e.g., via one or more buses).

QCL component 1120 may identify a quasi co-location relationship indicating that antenna ports of the base station used to transmit a synchronization signal are quasi co-located with antenna ports of the base station used to transmit a positioning reference signal. In some examples, the quasi co-location relationship comprises a Doppler shift, or a Doppler spread, or an average delay, or a delay spread, or one or more spatial parameters, or a combination thereof.

Indicator Component 1135 may transmit an indication of the quasi co-location relationship, and transmit a reference signal, where the identified quasi co-location relationship further indicates that antenna ports of the base station used to transmit the reference signal are quasi co-located with antenna ports of the base station used to transmit the positioning reference signal. In some cases, transmitting the indication of the quasi co-location relationship includes transmitting a system information transmission that includes the indication of the quasi co-location relationship, the system information transmission including a SIB, or a RMS), or an OSIB, or a combination thereof. In some cases, the transmitted reference signal includes a PBCH DMRS, or a CSI-RS, or a combination thereof.

Reference signal component 1125 may transmit the reference signal and the positioning reference signal based on the transmitted indication of the quasi co-location relationship. A synchronization signal may be an example of a reference signal. In some examples, the reference signal may comprise a synchronization signal, or a CSI-RS for tracking, or a CSI-RS for beam management, or a CSI-RS for radio resource management, or a PBCH DMRS, or a CSI-RS, or a combination thereof. In some cases, the synchronization signal includes a PSS, or a SSS, or a combination thereof.

Cell identifier component 1130 may transmit a set of cell identifiers for cells that transmit positioning reference signals. In some cases, transmitting the set of cell identifiers for the cells that transmit the positioning reference signals includes transmitting a RRC message, or system information, or a DCI, or a positioning protocol message, or system information, or a combination thereof, indicating the set of cell identifiers.

Figure 12:
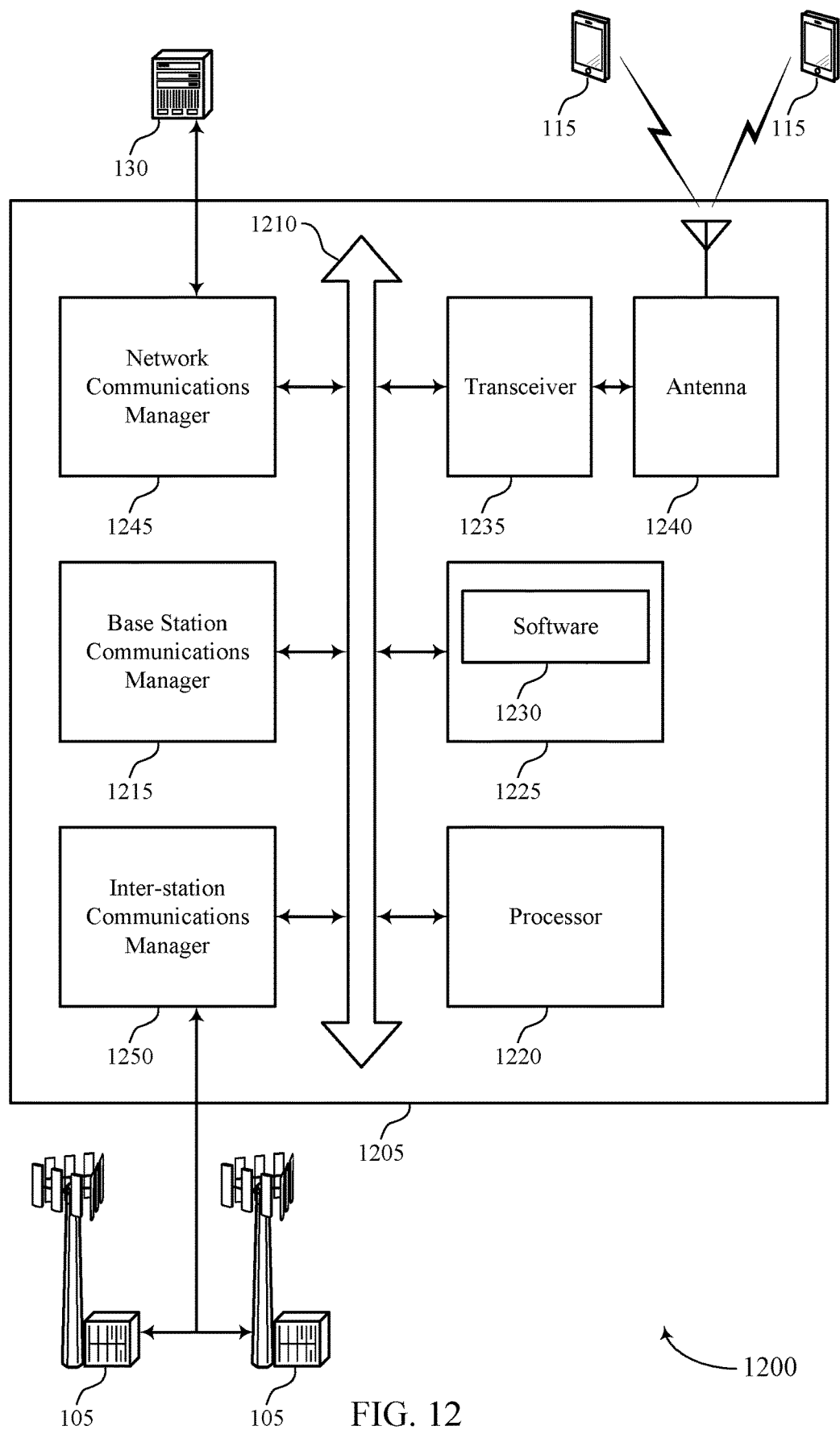
FIG. 12 illustrates a block diagram of a system including a base station that supports downlink positioning reference signals in multi-beam systems in accordance with aspects of the present disclosure.

FIG. 12 shows a diagram of a system 1200 including a device 1205 that supports downlink positioning reference signals in multi-beam systems in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting downlink positioning reference signal in multi-beam systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support downlink positioning reference signal in multi-beam systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
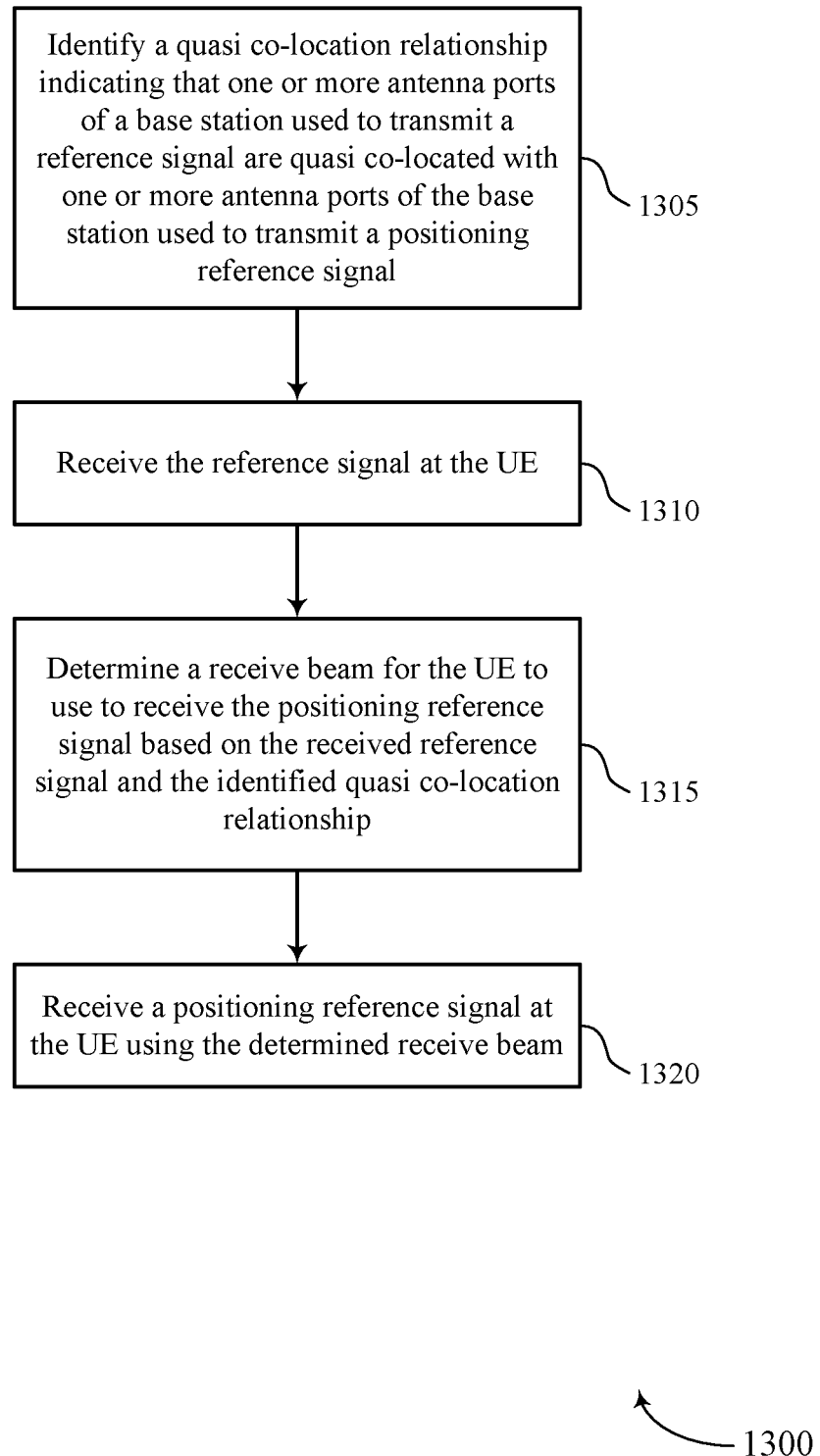
FIGS. 13 through 16 illustrate methods for downlink positioning reference signal in multi-beam systems in accordance with aspects of the present disclosure.

FIG. 13 shows a flowchart illustrating a method 1300 for downlink positioning reference signal in multi-beam systems in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a quasi co-location relationship indicating that one or more antenna ports of a base station used to transmit a reference signal are quasi co-located with one or more antenna ports of the base station used to transmit a positioning reference signal. The operations of block 1305 may be performed according to the methods described herein. In certain examples, aspects of the operations of block 1305 may be performed by a QCL component as described with reference to FIGS. 5 through 8.

At block 1310 the UE 115 may receive the reference signal at the UE. The operations of block 1310 may be performed according to the methods described herein. In certain examples, aspects of the operations of block 1310 may be performed by a reference signal component as described with reference to FIGS. 5 through 8.

At block 1315 the UE 115 may determine a receive beam for the UE to use to receive the positioning reference signal based at least in part on the received reference signal and the identified quasi co-location relationship. The operations of block 1315 may be performed according to the methods described herein. In certain examples, aspects of the operations of block 1315 may be performed by a beam determination component as described with reference to FIGS. 5 through 8.

At block 1320 the UE 115 may receive a positioning reference signal at the UE using the determined receive beam. The operations of block 1320 may be performed according to the methods described herein. In certain examples, aspects of the operations of block 1320 may be performed by a PRS component as described with reference to FIGS. 5 through 8.

Figure 14:
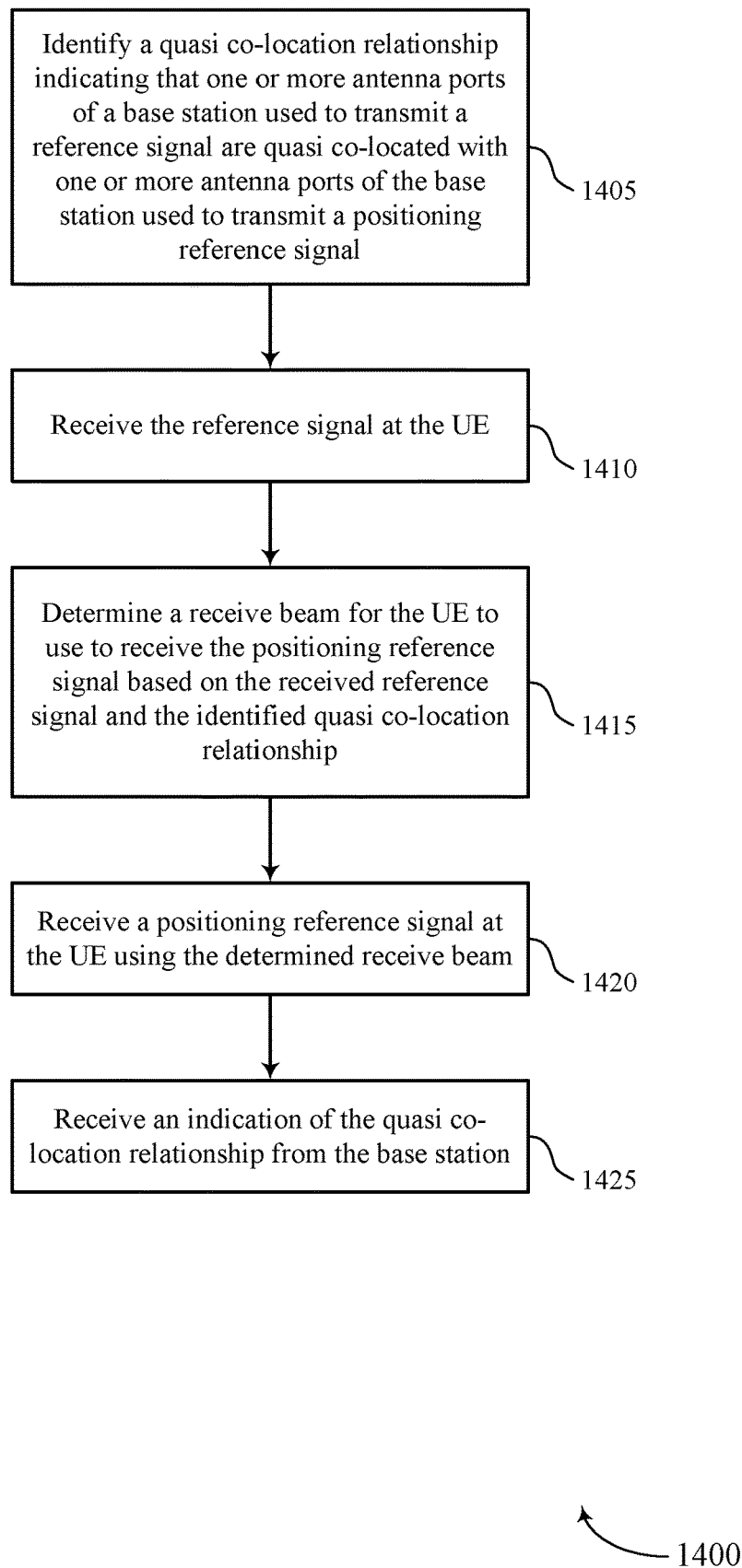

FIG. 14 shows a flowchart illustrating a method 1400 for downlink positioning reference signal in multi-beam systems in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a quasi co-location relationship indicating that one or more antenna ports of a base station used to transmit a reference signal are quasi co-located with one or more antenna ports of the base station used to transmit a positioning reference signal. The operations of block 1405 may be performed according to the methods described herein. In certain examples, aspects of the operations of block 1405 may be performed by a QCL component as described with reference to FIGS. 5 through 8.

At block 1410 the UE 115 may receive the reference signal at the UE. The operations of block 1410 may be performed according to the methods described herein. In certain examples, aspects of the operations of block 1410 may be performed by a reference signal component as described with reference to FIGS. 5 through 8.

At block 1415 the UE 115 may determine a receive beam for the UE to use to receive the positioning reference signal based at least in part on the received reference signal and the identified quasi co-location relationship. The operations of block 1415 may be performed according to the methods described herein. In certain examples, aspects of the operations of block 1415 may be performed by a beam determination component as described with reference to FIGS. 5 through 8.

At block 1420 the UE 115 may receive a positioning reference signal at the UE using the determined receive beam. The operations of block 1420 may be performed according to the methods described herein. In certain examples, aspects of the operations of block 1420 may be performed by a PRS component as described with reference to FIGS. 5 through 8.

At block 1425 the UE 115 may receive an indication of the quasi co-location relationship from the base station. The operations of block 1425 may be performed according to the methods described herein. In certain examples, aspects of the operations of block 1425 may be performed by a QCL component as described with reference to FIGS. 5 through 8.

Figure 15:
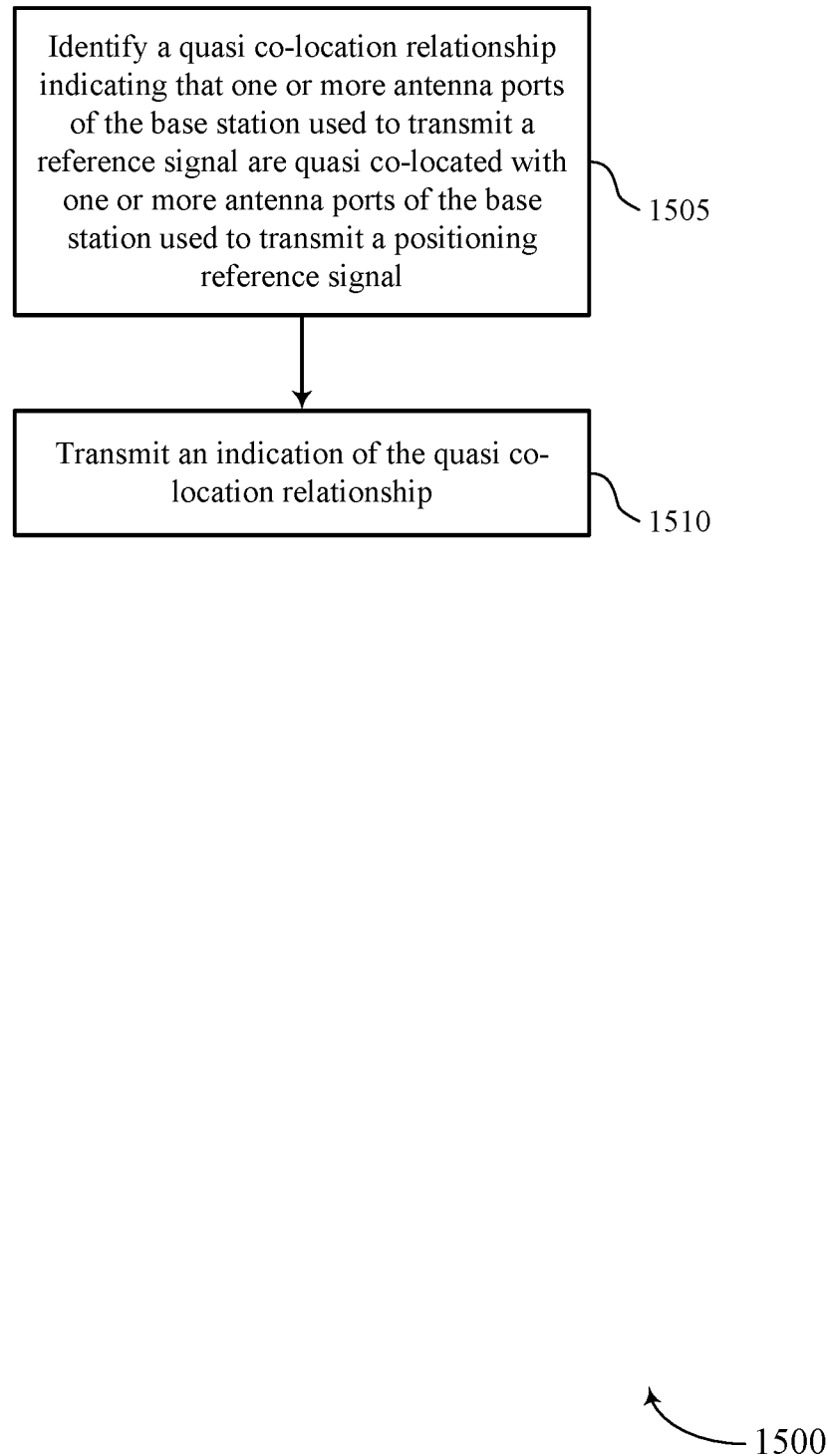

FIG. 15 shows a flowchart illustrating a method 1500 for downlink positioning reference signal in multi-beam systems in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a quasi co-location relationship indicating that one or more antenna ports of the base station used to transmit a reference signal are quasi co-located with one or more antenna ports of the base station used to transmit a positioning reference signal. The operations of block 1505 may be performed according to the methods described herein. In certain examples, aspects of the operations of block 1505 may be performed by a QCL component as described with reference to FIGS. 9 through 12.

At block 1510 the base station 105 may transmit an indication of the quasi co-location relationship. The operations of block 1510 may be performed according to the methods described herein. In certain examples, aspects of the operations of block 1510 may be performed by a QCL component as described with reference to FIGS. 9 through 12.

Figure 16:
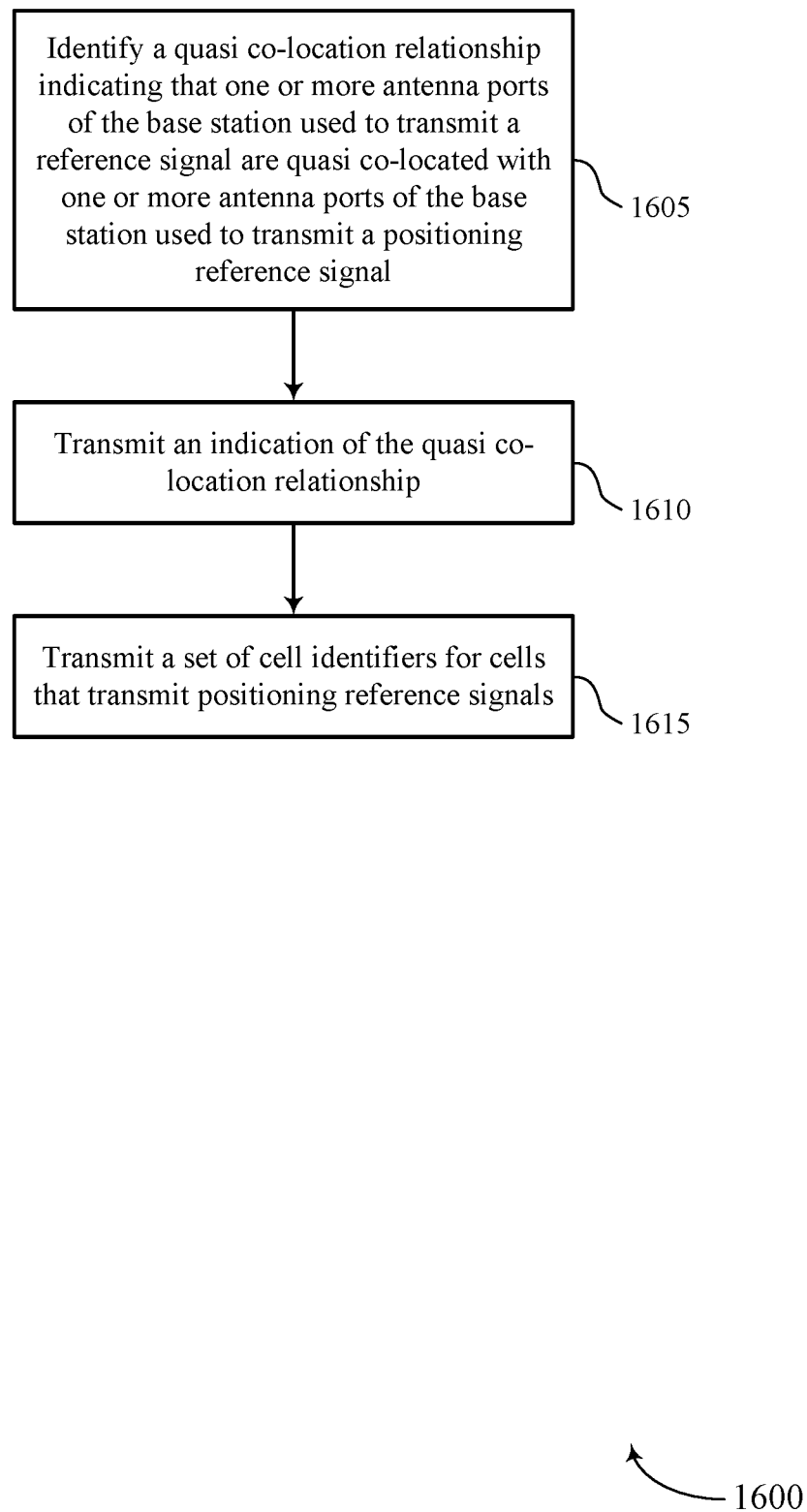

FIG. 16 shows a flowchart illustrating a method 1600 for downlink positioning reference signal in multi-beam systems in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify a quasi co-location relationship indicating that one or more antenna ports of the base station used to transmit a reference signal are quasi co-located with one or more antenna ports of the base station used to transmit a positioning reference signal. The operations of block 1605 may be performed according to the methods described herein. In certain examples, aspects of the operations of block 1605 may be performed by a QCL component as described with reference to FIGS. 9 through 12.

At block 1610 the base station 105 may transmit an indication of the quasi co-location relationship. The operations of block 1610 may be performed according to the methods described herein. In certain examples, aspects of the operations of block 1610 may be performed by a QCL component as described with reference to FIGS. 9 through 12.

At block 1615 the base station 105 may transmit a set of cell identifiers for cells that transmit positioning reference signals. The operations of block 1615 may be performed according to the methods described herein. In certain examples, aspects of the operations of block 1615 may be performed by a cell identifier component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a quasi co-location relationship indicating that one or more antenna ports of a plurality of base stations used to transmit reference signals are quasi co-located with one or more antenna ports of the plurality of base stations used to transmit positioning reference signals;
    receiving, from the plurality of base stations, the reference signals at the UE;
    determining a set of receive beams for the UE to use to receive the positioning reference signals based at least in part on the received reference signals and the identified quasi co-location relationship;
    receiving, from a base station, a positioning protocol signal comprising an indication of a set of cell identifiers corresponding to cells that support at least a first type of positioning reference signals; and
    receiving, based at least in part on the received set of cell identifiers, the positioning reference signals at the UE using the determined set of receive beams, wherein a position of the UE is determined based at least in part on the received positioning reference signals.

2. The method of claim 1, wherein determining the set of receive beams for the UE to use to receive the positioning reference signals comprises:
    measuring a signal strength of the reference signals; and
    the method further comprising identifying the set of receive beams based at least in part on the measured signal strength and the identified quasi co-location relationship.

3. The method of claim 1, further comprising:
    receiving, from the base station, system information that includes an indication of the quasi co-location relationship.

4. The method of claim 1, wherein the quasi co-location relationship is pre-configured.

5. The method of claim 1, further comprising:
    monitoring for positioning reference signals from one or more of the cells based at least in part on the received set of cell identifiers.

6. The method of claim 1, wherein receiving the positioning reference signals comprises:
    receiving, at the UE, a second reference signal from a second cell and a third reference signal;
    determining a second receive beam and a third receive beam for the UE to use to receive positioning reference signals; and receiving a second positioning reference signal using the determined second receive beam and a third positioning reference signal using the determined third receive beam.

7. The method of claim 1, wherein the reference signals comprise synchronization signals, or channel state indication reference signals (CSI-RSs) for tracking, or CSI-RSs for beam management, or CSI-RSs for radio resource management, or physical broadcast channel (PBCH) demodulation reference signals (DMRSs), or a combination thereof.

8. The method of claim 7, wherein the reference signals are synchronization signals comprising primary synchronization signals (PSSs), or secondary synchronization signals (SSSs), or a combination thereof.

9. The method of claim 1, wherein the quasi co-location relationship comprises a Doppler shift, or a Doppler spread, or an average delay, or a delay spread, or one or more spatial parameters, or a combination thereof.

10. A method for wireless communication at a base station, comprising:
identifying a quasi co-location relationship indicating that one or more antenna ports of a plurality of base stations used to transmit reference signals are quasi co-located with one or more antenna ports of the plurality of base stations used to transmit positioning reference signals;
transmitting an indication of the quasi co-location relationship; and
transmitting, to the UE, a positioning protocol signal comprising an indication of a set of cell identifiers corresponding to cells that support at least a first type of positioning reference signals comprising the positioning reference signals.

11. The method of claim 10, further comprising:
transmitting a reference signal and a positioning reference signal based at least in part on the transmitted indication of the quasi co-location relationship.

12. The method of claim 10, wherein the reference signals comprise synchronization signals, or channel state indication reference signals (CSI-RSs) for tracking, or CSI-RSs for beam management, or CSI-RSs for radio resource management, or physical broadcast channel (PBCH) demodulation reference signals (DMRSs), or a combination thereof.

13. The method of claim 12, wherein the reference signals are synchronization signals comprising primary synchronization signals (PSSs), or secondary synchronization signals (SSSs), or a combination thereof.

14. The method of claim 10, wherein transmitting the indication of the quasi co-location relationship comprises:
transmitting a system information that includes the indication of the quasi co-location relationship.

15. The method of claim 10, further comprising:
transmitting a set of cell identifiers for cells that transmit positioning reference signals.

16. The method of claim 6, wherein the quasi co-location relationship comprises a Doppler shift, or a Doppler spread, or an average delay, or a delay spread, or one or more spatial parameters, or a combination thereof.

17. An apparatus for wireless communication at a user equipment (UE), comprising:
a processor;
memory in electronic communication with the processor; and
instructions stored in the memory and operable, when executed by the processor, to cause the apparatus to:
identify a quasi co-location relationship indicating that one or more antenna ports of a plurality of base stations used to transmit reference signals are quasi co-located with one or more antenna ports of the plurality of base stations used to transmit positioning reference signals;
receive the reference signals at the UE;
determine a set of receive beams for the UE to use to receive the positioning reference signals based at least in part on the received reference signals and the identified quasi co-location relationship;
receive, from a base station, a positioning protocol signal comprising an indication of a set of cell identifiers corresponding to cells that support at least a first type of positioning reference signals; and
receive, based at least in part on the received set of cell identifiers, the positioning reference signals at the UE using the determined set of receive beams wherein a position of the UE is determined based at least in part on the received positioning reference signals.

18. The apparatus of claim 17, wherein determining the set of receive beams for the UE to use to receive the positioning reference signals comprises:
measuring a signal strength of the reference signals; and
the instructions are further executable to identify the set of receive beams based at least in part on the measured signal strength and the identified quasi co-location relationship.

19. The apparatus of claim 17, wherein the instructions are further executable by the processor to:
receive, from the base station, system information that includes an indication of the quasi co-location relationship.

20. The apparatus of claim 17, wherein the quasi co-location relationship is pre-configured.

21. The apparatus of claim 17, wherein the instructions are further executable by the processor to:
monitor for positioning reference signals from one or more of the cells based at least in part on the received set of cell identifiers.

22. The apparatus of claim 17, wherein receiving the positioning reference signals comprises:
receiving, at the UE, a second reference signal from a second cell and a third reference signal from a third cell;
determining a second receive beam and a third receive beam for the UE to use to receive positioning reference signals; and
receiving a second positioning reference signal using the determined second receive beam and a third positioning reference signal using the determined third receive beam.

23. The apparatus of claim 17, wherein the reference signals comprise synchronization signals, or channel state indication reference signals (CSI-RSs) for tracking, or CSI-RSs for beam management, or CSI-RSs for radio resource management, or physical broadcast channel (PBCH) demodulation reference signals (DMRSs), or a combination thereof.

24. An apparatus for wireless communication at a base station, comprising:
a processor;
memory in electronic communication with the processor; and
instructions stored in the memory and operable, when executed by the processor, to cause the apparatus to:
identify a quasi co-location relationship indicating that one or more antenna ports of a plurality of base stations used to transmit reference signals are quasi co-located with one or more antenna ports of the plurality of base stations used to transmit positioning reference signals;
transmit an indication of the quasi co-location relationship; and
transmit, to the UE, a positioning protocol signal comprising an indication of a set of cell identifiers corresponding to cells that support at least a first type of positioning reference signals comprising the positioning reference signals.

25. The apparatus of claim 24, wherein the instructions are further executable by the processor to:
transmit a reference signal and a positioning reference signal based at least in part on the transmitted indication of the quasi co-location relationship.

26. The apparatus of claim 24, wherein transmitting the indication of the quasi co-location relationship comprises:
transmitting a system information that includes the indication of the quasi co-location relationship.

27. The apparatus of claim 24, wherein the instructions are further executable by the processor to:
transmit a set of cell identifiers for cells that transmit positioning reference signals.

28. The apparatus of claim 24, wherein reference signals comprise synchronization signals, or channel state indication reference signals (CSI-RSs) for tracking, or CSI-RSs for beam management, or CSI-RSs for radio resource management, or physical broadcast channel (PBCH) demodulation reference signals (DMRSs), or a combination thereof.

29. A method for wireless communication at a user equipment (UE), comprising:
receiving, from a base station, system information comprising an indication of a quasi co-location relationship wherein configurations of one or more antenna ports of a plurality of base stations used to transmit synchronization signals during a mobility procedure are quasi co-located with one or more antenna ports of the plurality of base stations used to transmit positioning reference signals;
receiving, from the plurality of base stations, the synchronization signals at the UE;
determining a set of receive beams for the UE to use to receive the positioning reference signals based at least in part on the received synchronization signals and the indicated quasi co-location relationship; and
receiving, from the plurality of base stations using the set of receive beams, the positioning reference signals, wherein a position of the UE based at least in part on the received positioning reference signals.

30. The method of claim 1, wherein the plurality of base stations comprises one or more serving base stations, one or more neighboring base stations, or a combination thereof.

\* \* \* \* \*